United States Patent
Lee et al.

(10) Patent No.: US 11,921,857 B2
(45) Date of Patent: Mar. 5, 2024

(54) ELECTRONIC DEVICE FOR PROVIDING SERVICE BY USING SECURE ELEMENT, AND OPERATING METHOD THEREOF

(71) Applicant: Samsung Electronics Co., Ltd., Gyeonggi-do (KR)

(72) Inventors: Taeckki Lee, Gyeonggi-do (KR); Jongsu Kim, Gyeonggi-do (KR); Eunyoung Kwon, Gyeonggi-do (KR); Dasom Lee, Gyeonggi-do (KR); Daehaeng Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 309 days.

(21) Appl. No.: 17/277,600

(22) PCT Filed: Sep. 11, 2019

(86) PCT No.: PCT/KR2019/011774
§ 371 (c)(1),
(2) Date: Mar. 18, 2021

(87) PCT Pub. No.: WO2020/060101
PCT Pub. Date: Mar. 26, 2020

(65) Prior Publication Data
US 2022/0035921 A1     Feb. 3, 2022

(30) Foreign Application Priority Data

Sep. 20, 2018  (KR) .................. 10-2018-0112989

(51) Int. Cl.
*G06F 21/57*  (2013.01)
*G06F 21/71*  (2013.01)
*G06F 21/78*  (2013.01)

(52) U.S. Cl.
CPC .............. *G06F 21/57* (2013.01); *G06F 21/71* (2013.01); *G06F 21/78* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 8,706,081 | B1 * | 4/2014 | Paya | H04M 17/103 |
| | | | | 455/410 |
| 8,904,195 | B1 * | 12/2014 | Rahat | G06F 21/86 |
| | | | | 713/194 |

(Continued)

FOREIGN PATENT DOCUMENTS

| CN | 106445065 | 2/2017 |
|---|---|---|
| CN | 108173811 | 6/2018 |

(Continued)

OTHER PUBLICATIONS

Uri Kanonov et al., "Secure Containers in Android: The Samsung KNOX Case Study", Oct. 24, 2016, 10 pages.

(Continued)

*Primary Examiner* — Michael Pyzocha
(74) *Attorney, Agent, or Firm* — The Farrell Law Firm, P.C.

(57) ABSTRACT

Various embodiments of the present invention relate to an electronic device for providing a service by using a secure element, and an operating method thereof. The electronic device comprises: a processor for acquiring secure state information of the electronic device; and a secure element operating under the control of the processor, receiving the secure state information of the electronic device from the processor, and including a repository for storing the received secure state information of the electronic device, wherein the secure element senses a security-related service request (Continued)

command, acquires the secure state information about the electronic device from the repository, and can process or ignore the sensed security-related service request command on the basis of whether the acquired secure state information of the electronic device satisfies a designated condition. Other embodiments are also possible.

12 Claims, 15 Drawing Sheets

(56) References Cited

U.S. PATENT DOCUMENTS

| | | | | |
|---|---|---|---|---|
| 9,332,060 | B2* | 5/2016 | Arvidsson | G06F 21/77 |
| 9,495,558 | B2* | 11/2016 | Sung | G06F 21/6245 |
| 9,817,992 | B1* | 11/2017 | Paczkowski | H04W 12/04 |
| 2005/0131671 | A1* | 6/2005 | Kashyap | G06F 21/35 |
| | | | | 703/24 |
| 2009/0282397 | A1 | 11/2009 | Leporini et al. | |
| 2012/0084836 | A1 | 4/2012 | Mahaffey et al. | |
| 2012/0137369 | A1 | 5/2012 | Shin et al. | |
| 2012/0178420 | A1 | 7/2012 | Ould | |
| 2013/0007245 | A1* | 1/2013 | Malik | H04W 12/37 |
| | | | | 709/223 |
| 2013/0130649 | A1* | 5/2013 | Mahaffey | H04W 12/08 |
| | | | | 455/410 |
| 2013/0339166 | A1* | 12/2013 | Baer | G06Q 20/3278 |
| | | | | 705/16 |
| 2014/0057597 | A1* | 2/2014 | Velusamy | H04W 12/08 |
| | | | | 455/410 |
| 2014/0256251 | A1* | 9/2014 | Caceres | H04W 12/084 |
| | | | | 455/41.1 |
| 2014/0298484 | A1* | 10/2014 | Sung | H04W 12/08 |
| | | | | 726/27 |
| 2014/0344899 | A1* | 11/2014 | Kwon | H04W 12/08 |
| | | | | 726/4 |
| 2015/0199509 | A1* | 7/2015 | Wille | G06F 21/74 |
| | | | | 726/16 |
| 2015/0286811 | A1* | 10/2015 | Phan | H04L 63/0861 |
| | | | | 726/7 |
| 2017/0048706 | A1 | 2/2017 | Kang et al. | |
| 2017/0061436 | A1 | 3/2017 | Liu et al. | |
| 2017/0068953 | A1 | 3/2017 | Kim et al. | |
| 2017/0103382 | A1 | 4/2017 | Kim et al. | |
| 2017/0186015 | A1 | 6/2017 | Jin et al. | |
| 2017/0251369 | A1* | 8/2017 | Alberti | G06F 21/445 |
| 2017/0300716 | A1* | 10/2017 | Reisgies | G06F 21/72 |
| 2018/0082303 | A1* | 3/2018 | Chan-Bauza | G06Q 20/4016 |
| 2018/0158046 | A1 | 6/2018 | Choi et al. | |
| 2018/0349886 | A1* | 12/2018 | Blakesley | G06Q 20/363 |
| 2019/0102556 | A1* | 4/2019 | Case | G06F 9/4406 |
| 2019/0251298 | A1* | 8/2019 | Zhu | G06F 21/74 |
| 2019/0318127 | A1* | 10/2019 | Pan | G06F 21/60 |
| 2020/0021445 | A1* | 1/2020 | Caceres | G06F 21/44 |
| 2020/0082370 | A1* | 3/2020 | Yang | G06Q 20/20 |
| 2021/0165874 | A1* | 6/2021 | Li | G06F 21/53 |

FOREIGN PATENT DOCUMENTS

| | | |
|---|---|---|
| CN | 108337235 | 7/2018 |
| KR | 1020120057871 | 6/2012 |
| KR | 1204726 | 11/2012 |
| KR | 1020120136126 | 12/2012 |
| KR | 1020130015236 | 2/2013 |
| KR | 1020140139752 | 12/2014 |
| KR | 1020170041465 | 4/2017 |
| KR | 1020170077425 | 7/2017 |

OTHER PUBLICATIONS

European Search Report dated Sep. 20, 2021 issued in counterpart application No. 19862674.9-1218, 8 pages.
PCT/ISA/210 Search Report issued on PCT/KR2019/011774, dated Jan. 8, 2020, pp. 5.
PCT/ISA/237 Written Opinion issued on PCT/KR2019/011774, dated Jan. 8, 2020, pp. 4.
Korean Office Action dated Nov. 20, 2022 issued in counterpart application No. 10-2018-0112989, 12 pages.
KR Notice of Final Rejection dated May 22, 2023 issued in counterpart application No. 10-2018-0112989, 7 pages.
European Search Report dated Jun. 29, 2023 issued in counterpart application No. 19862674.9-1218, 4 pages.
Chinese Office Action dated Nov. 1, 2023 Issued in counterpart application No. 201980061881.9, 21 pages.
KR Notice of Patent Grant dated Sep. 18, 2023 Issued in counterpart application No. 10-2018-0112989, 5 pages.

* cited by examiner

ELECTRONIC DEVICE FOR PROVIDING SERVICE BY USING SECURE ELEMENT, AND OPERATING METHOD THEREOF

PRIORITY

This application is a National Phase Entry of International Application No. PCT/KR2019/011470, which was filed on Sep. 11, 2019, and claims priority to Korean Patent Application No. 10-2018-0112989, which was filed in the Korean Intellectual Property Office on Sep. 20, 2018, the entire content of each of which is incorporated herein by reference.

BACKGROUND

1. Field

Various embodiments of the present disclosure relate to an electronic device for offering a service by using a secure element, and an operating method thereof.

2. Related Art

An electronic device can provide various security related services by using a secure element. The secure element is a hardware module for generating, storing, and/or managing information sensitive to security such as a credential. The secure element stores a service application program such as a credit payment service or a transit card, and stores and/or manages a certificate (e.g., an identification card, a resident registration certificate, a driver license certificate, an admission certificate, a passport, or an electronic identification (eID)) related to a personal status or credential.

The secure element is designed to have an independent security in its own secure element chip, irrespective of a secure quality of another element (e.g., an off card entity (OCE)) which gains access to the secure element. For example, the secure element is designed to detect various illegal attacks in a hardware or software manner, and safely protect the information stored in the secure element from the detected illegal attacks.

A secure element is mounted in and is used subordinately to an electronic device needing security such as a mobile device or an IoT device, etc. For example, when a valid command is received from a host processor of the electronic device, the secure element processes a function corresponding to the received command, without a particular restriction. That is, the secure element operates subordinately to the host processor and therefore, processes, without filtering, valid all commands inputted from the host processor. Accordingly, when a security threat is generated in the electronic device, the secure element included in the electronic device can be vulnerable in security. For example, when the electronic device is rooted or counterfeited, an access control for the secure element included in the electronic device is disabled, whereby security related information can be exposed to an illegal attack.

Accordingly, various embodiments of the present disclosure relate to an electronic device for offering a secure service through a secure element on the basis of a secure state of the electronic device, and an operating method thereof.

SUMMARY

According to various embodiments, an electronic device can include a processor for acquiring secure state information of the electronic device, and a secure element operating under the control of the processor, receiving the secure state information of the electronic device from the processor, and including a repository for storing the received secure state information of the electronic device. The secure element can obtain a security-related service request command, acquire the secure state information of the electronic device from the repository, and process or ignore the obtained security-related service request command, on the basis of whether the acquired secure state information of the electronic device satisfies a specified condition.

According to various embodiments, an operating method of an electronic device can include acquiring, by a processor, secure state information of the electronic device, storing, by a secure element operating under the control of the processor, the secure state information of the electronic device in a repository within the secure element, obtaining, by the secure element, a security-related service request command, acquiring, by the secure element, the secure state information of the electronic device stored in the internal repository, and processing or ignoring, by the secure element, the obtained security-related service request command, on the basis of whether the acquired secure state information of the electronic device satisfies a specified condition.

Various embodiments can determine the offering or non-offering of a service through a secure element on the basis of a secure state of an electronic device in the electronic device, thereby preventing security related information stored in the secure element from being exposed to an illegal attack in a state where the electronic device is vulnerable in security, and offering a security related service of a higher quality.

DETAILED DESCRIPTION

Figure 1:
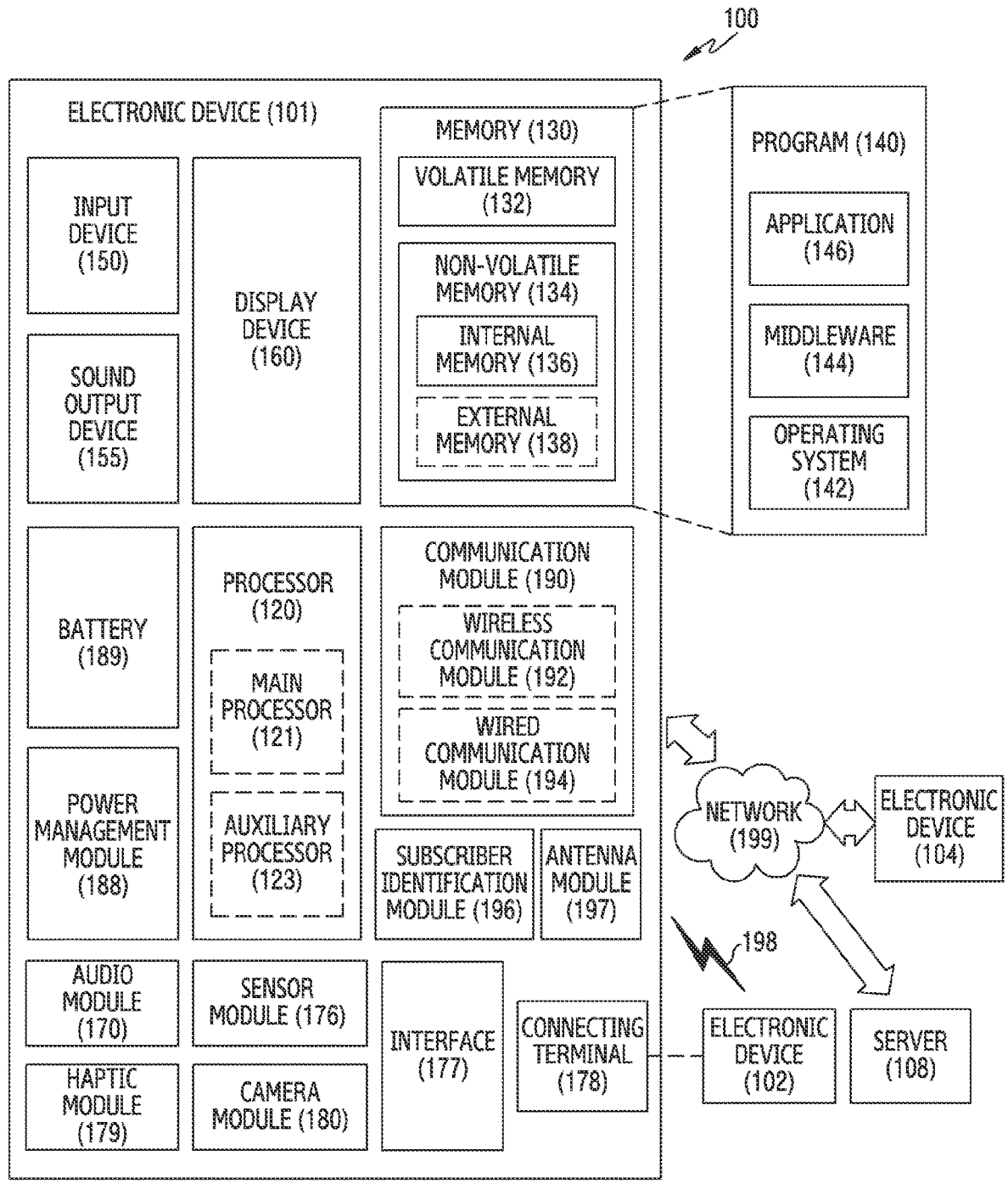
FIG. 1 is a block diagram of an electronic device within a network environment according to various embodiments.

Various embodiments of the present document are mentioned below with reference to the accompanying drawings. It should be appreciated that an embodiment and the terms used therein do not intend to limit the technology set forth therein to a particular embodiment form, and include various modifications, equivalents, and/or alternatives of the corresponding embodiment. In relation to a description of the drawing, like reference symbols can be used for like components. The expression of a singular form can include the expression of a plural form unless otherwise dictating clearly in context.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a secure element 172, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197, according to an embodiment, may formed of a conductor or a conductive pattern, and may further include other components (e.g., RFIC) in addition to the conductor or the conductive pattern according to some embodiments. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The secure element 172 is a module for providing, storing, and/or managing information sensitive to security. The secure element 172, for example, can store and/or manage an application program (or applet) offering a credit payment service or a transit card service, and can store and/or manage information and/or a certificate (e.g., an identification card, a resident registration certificate, a driver license certificate, an admission certificate, a passport, or an electronic identification (eID)) related to a personal status or credential. The secure element 172 can be implemented as an independent circuit, and can include a separate processor. The secure element 172 includes the separate processor, but can operate according to the control of the processor 120. For example, the secure element 172 can operate subordinately to the processor 120. The secure element 172 can be activated and/or inactivated by the processor 120 or the wireless communication module 190.

The secure element 172 can include an embedded secure element (eSE) which is built in a fixed chip of the electronic device 101. The secure element 172 can be driven on the basis of an operating system different from an operating system of the electronic device 101. For example, the secure element 172 can operate based on an independent operating system. According to an embodiment, the secure element 172 can communicate with the processor 120, and/or at least one another component, based on a secure channel protocol. According to an embodiment, the secure element 172 can communicate with the processor 120 and/or at least one another component by using a single wired protocol (SWP), an ISO, or a serial peripheral interface (SPI). According to an embodiment, the secure element 172 can install an applet offered by a service provider, and offer a security related service by using the installed applet. According to an embodiment, the security element 172 can include the subscriber identification module 196. For example, in FIG. 1 illustrated, the secure element 172 and the subscriber identification module 196 are constructed as separate modules, but the secure element 172 and the subscriber identification module 196 can be constructed as one module according to a design scheme.

Figure 2:
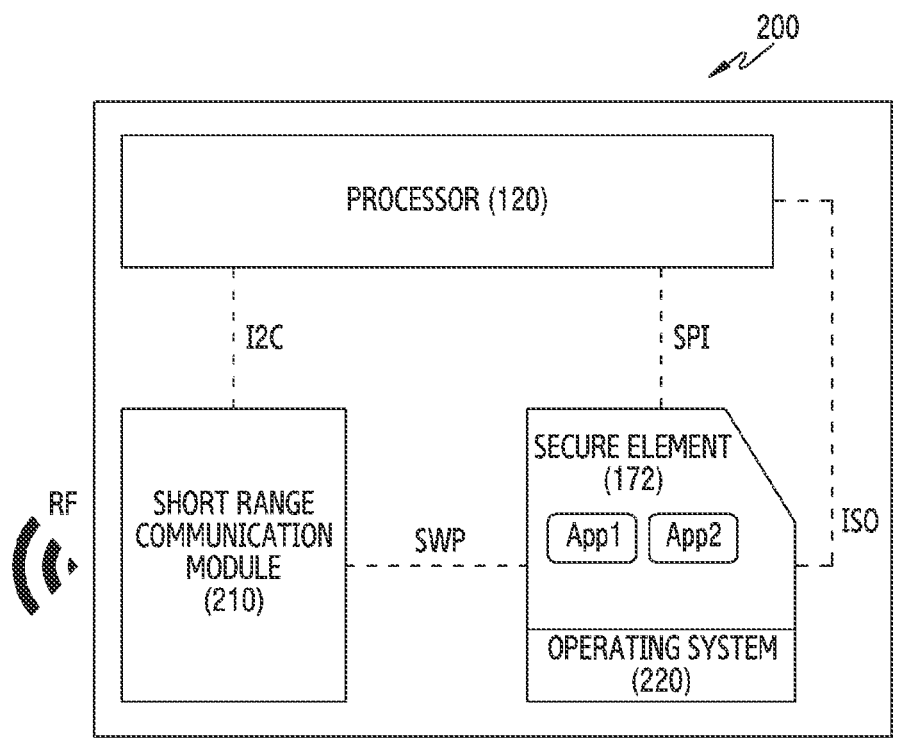
FIG. 2 is a block diagram illustrating a communication structure between a secure element and other components according to various embodiments.

FIG. 2 is a block diagram 200 illustrating a communication structure between the secure element 172 and at least one another component according to various embodiments. According to an embodiment, the at least one another component can be the processor 120 included in the electronic device 101 of FIG. 1.

Referring to FIG. 2, a processor 120 (e.g., the processor 120 of FIG. 1) of various embodiments can be connected with the secure element 172 (e.g., the secure element 172 of FIG. 1) directly and/or indirectly through at least one interface. The at least one interface, for example, can include at least one of an I2C, an SWP, an SPI, or an ISO. The numerated interfaces are examples, and various embodiments of the present disclosure will not be limited to these. For example, the processor 120 can be connected with the secure element 172 directly and/or indirectly through interfaces complying with other communication protocols besides the numerated interfaces. According to an embodiment, the processor 120 can communicate with the secure element 172 indirectly through at least one another component (e.g., a short range communication module 210 (e.g., the wireless communication module 192 of FIG. 1)) by using a separate access rule enforcer (or an access rule enforcing module). According to an embodiment, the processor 120 can communicate with the secure element 172 directly by using an access authority watcher (or an access authority watching module). According to an embodiment, the access rule enforcer can be a software module for managing an access authority for an I2C interface, and/or an access authority for the secure element 172 through the short range communication module 210. According to an embodiment, the access authority watcher can be a software module for managing an access authority for an SPI interface, and/or an access authority for the secure element 172 through the SPI interface.

According to various embodiments, the processor 120 can obtain a secure state of the electronic device 101. According to an embodiment, the processor 120 can obtain at least one of the rooting or non-rooting of the electronic device, the obtaining or non-obtaining of malware, the change (break) or non-change of a warranty bit, the counterfeiting or non-counterfeiting of an access rule enforcer for the secure element 172, the obtaining or non-obtaining of an illegal attack to a system region of the electronic device 101, or the obtaining or non-obtaining of an illegal attack to an application installed in the electronic device 101. The processor 120 can obtain the secure state of the electronic device 101 by using a secure state obtaining technology known to those skilled in the art. For example, the processor 120 can obtain the secure state of the electronic device 101 by using the warranty bit. For instance, at booting of the electronic device 101, the processor 120 can check the warranty bit to determine whether a boot image is normal. In response to the warranty bit being changed, the processor 120 can determine that the booting image is abnormal, and determine the secure state of the electronic device 101 by a rooting state. This is an example, and a secure state obtaining technique of various embodiments of the present disclosure is not limited to this. For example, according to various embodiments of the present disclosure, various secure state obtaining techniques known to those skilled in the art can be used.

According to various embodiments, the processor 120 can offer secure state information indicating an obtained secure state of the electronic device 101, to the secure element 172. The secure state information of the electronic device 101, for example, can include at least one of information indicating a secure state of a system region of the electronic device 101, or information indicating a secure state of an application installed in the electronic device 101. The secure state information can be constructed in a form of indicating a secure level (or a secure quality), or indicating the kind of a secure problem. For example, the secure level can be previously defined differentially by a step of level 0 to level N, and the processor 120 can determine a secure level corresponding to a presently obtained secure state of the electronic device 101 on the basis of a previously defined secure level. For example, "secure level N" can be a state in which a secure level is the highest step while the electronic device 101 is safe, and "secure level 0" can be defined as a state in which the secure level is the lowest step while a secure state of the electronic device 101 is very weak. "Secure level N-a" can be defined as a state in which the electronic device 101 is rooted and thus is vulnerable in security, and "secure level N-b" can be defined as a state in which the electronic device 101 has been rooted and an access rule enforcer for the secure element 172 is counterfeited and thus is vulnerable in security. For another example, the secure state information of the electronic device 101 can be defined to indicate a state in which at least one secure problem among rooting, access rule enforcer counterfeit, malware obtaining, or warranty bit breaking is obtained. In response to the rooting of the electronic device 101 being obtained, the processor 120 can provide secure state information which indicates "secure level N-a" and "being rooted", and offer the provided secure state information to the secure element 172. The definition of the secure state information can be determined and/or changed by a service provider and/or a designer.

According to various embodiments, the processor 120 can obtain a secure state of the electronic device 101 at a time point corresponding to at least one of a real time, a periodical time point, or a specified event occurrence time point, and offer secure state information indicating the obtained secure state, to the secure element 172. For example, the processor 120 can obtain the secure state of the electronic device 101 at at least one time point among a booting event occurrence time point, an application installation time point, a software update time point, or a security-related service request occurrence time point. According to an embodiment, the processor 120 can offer information indicating the obtained secure state of the electronic device 101, to the secure element 172, every secure state obtaining time point. For example, in response to the secure state of the electronic device 101 being obtained, the processor 120 can activate the secure element 172, and offer the secure state information of the electronic device 101 to the activated secure element 172. According to an embodiment, in response to a change of the secure state of the electronic device 101 being obtained, the processor 120 can offer information indicating the changed secure state of the electronic device 101 to the secure element 172. For example, the processor 120 can obtain the secure state of the electronic device 101 every real time, periodical time point, or specified event occurrence time point and, when a secure state of the electronic device 101 obtained at a present time point and at least a portion of a secure state of the electronic device 101 obtained at a previous time point are different from each other, the processor 120 can activate the secure element 172, and offer secure state information indicating the secure state of the electronic device 101 obtained at the present time point, to the activated secure element 172. According to an embodiment, the processor 120 can offer the secure state information to the secure element 172 by using a secure channel protocol. For example, the processor 120 can offer the secure state information to the secure element 172 through a reliable subject, and can prevent the secure state information from being counterfeited through this.

According to various embodiments, the processor 120 can execute a first application on the basis of a user input, and obtain that a security related service using the secure element 172 is requested by the first application which is being executed. The processor 120 can transmit a command of requesting the security related service to the secure element 172 by using the first application. According to an embodiment, when transmitting the command of requesting the security related service, the processor 120 can transmit the secure state information of the first application to the secure element 172 together. According to an embodiment, the processor 120 can transmit a command signal of including the secure state information of the first application while requesting the security related service, to the secure element 172. The secure state information of the first application can include information (e.g., application hash information) necessary for the integrity and/or reliability verification of the application.

According to various embodiments, the processor 120 can receive a response signal to a command of requesting a security related service from the secure element 172. The processor 120 can offer a security related service on the basis of the response signal from the secure element 172, or inform a user that it is impossible to offer the security related service. According to an embodiment, the processor 120 can determine whether the security related service has been permitted (or granted) from the secure element 172, on the basis of at least one information included in the response signal. When information corresponding to the command of requesting the security related service or information indicating a permission (or grant) for the security related service is included in the response signal, the processor 120 can offer the security related service on the basis of the at least one information. When information indicating a non-permission (or denial) of the security related service is included in the response signal, the processor 120 can control the display device 160 wherein a user interface indicating that the security related service cannot be offered is offered. The user interface indicating that the security related service cannot be offered can include secure state information. For example, when the information indicating the non-permission (or denial) of the security related service and the secure state information are included in the response signal received from the secure element 172, the processor 120 can control the display device 160 wherein the user interface indicating that the security related service cannot be offered is offered. According to an embodiment, in response to the response signal to the command of requesting the security related service not being received during a specified time, the processor 120 can control the display device 160 wherein the user interface indicating that the security related service cannot be offered is offered. For example, in response to the response signal not being received from the secure element 172 within a specified time duration from a time point of transmitting the command of requesting the security related service to the secure element 172, the processor 120 can control the display device 160 wherein the user interface indicating that the security related service cannot be offered is offered. According to an embodiment, the user interface indicating that the security related service cannot be offered can include information indicating that the security related service cannot be offered due to a secure state.

According to various embodiments, the secure element 172 can communicate with the processor 120 or the short range communication module 210 through at least one interface. According to an embodiment, the secure element 172 can be activated or operated periodically or at a specific time point by the processor 120 or the short range communication module 210.

According to various embodiments, the secure element 172 can receive secure state information through a secure channel protocol from the processor 120, and store the received secure state information in a repository within the secure element 172. For example, the secure state information can be stored in an immutable region within the secure element 172. The secure element 172 can add and store the secure state information received from the processor 120 at a present time, without deleting secure state information stored at a previous time point. For example, the secure element 172 can store the secure state information of the present time point and the secure state information of the past time point in the immutable region, together. According to an embodiment, the secure element 172 can store change history information of the secure state information.

According to various embodiments, in response to a security-related service request event being obtained, the secure element 172 can determine whether to offer a security related service on the basis of secure state information previously stored in the repository within the secure element 172. The secure element 172 can determine whether a specified condition corresponding to the requested security related service is satisfied, on the basis of the previously stored secure state information. The secure element 172 can operate wherein the security related service is offered in response to the specified condition being satisfied, and the security related service is blocked in response to the specified condition not being satisfied.

According to an embodiment, the secure element 172 can receive a command of requesting a security related service, and secure state information of a first application, from the processor 120. The secure element 172 can execute a related applet, based on the security-related service request command. For example, the security-related service request command can include information (e.g., identification information) of the first application providing the security-related service request command, or information (e.g., identification information) of a first applet corresponding to the first application. The secure element 172 can execute the first applet corresponding to the first application, on the basis of the information included in the security-related service request command. In response to the first application being a payment application, the first applet can be a payment applet. By using the first applet, the secure element 172 can acquire previously stored secure state information of the first application from the repository within the secure element 172. The previously stored secure state information of the first application can be information which, at a time point at which the first application and the first applet corresponding to the first application are stored in the electronic device 101, is offered to the secure element 172 from the processor 120 and is stored in the repository within the secure element 172. The secure element 172 can compare the secure state information of the first application received from the processor 120 and the secure state information of the first application acquired from the repository within the secure element 172. When the secure state information of the first application received from the processor 120 and the secure state information of the first application acquired from the repository within the secure element 172 are identical with each other, the secure element 172 can process the command of requesting the security related service by using the first applet, thereby controlling wherein the requested security related service is offered. When the secure state information of the first application received from the processor 120 and the secure state information of the first application acquired from the repository within the secure element 172 are not identical with each other, the secure element 172 can determine that security related service offering is impossible, and control wherein the command of requesting the security related service is not processed in the first applet. For example, the secure element 172 can ignore (or discard), without normally processing, the security-related service request command that the processor 120 has transmitted using the first application. According to an embodiment, in response to the first application being modified for a malicious purpose or being replaced with a similar another application, the received secure state information of the first application and the secure state information of the first application acquired from the repository within the secure element 172 can be different from each other.

According to an embodiment, the secure element 172 can receive a command (or signal) of requesting a security related service from an external electronic device through the processor 120 or a short range communication module (e.g., the short range communication module 210 of FIG. 2). The security-related service request command can include information (e.g., identification information) which indicates an applet related to the security-related service request command. The secure element 172 can execute a second applet being a related applet, on the basis of the information included in the security-related service request command. The second applet can be a transit card applet. The secure element 172 can acquire secure state information previously stored in the repository within the secure element 172 by using the second applet. The secure element 172 can determine whether the previously stored secure state information satisfies a specified condition, by using the second applet. For example, the specified condition can be a condition indicating that malware is not installed in the electronic device 101. For another example, the specified condition can be a condition indicating that the electronic device 101 is not rooted and malware is not installed. For further example, the specified condition can include a secure level 0. This is an example, and various embodiments of the present disclosure are not limited to these. In response to it being identified that the previously stored secure state information satisfies the specified condition, the secure element 172 can process the command of requesting the security related service by using the second applet, thereby controlling wherein the requested security related service is offered. In response to it being identified that the previously stored secure state information does not satisfy the specified condition, the secure element 172 can determine that, because a secure state is weak, it is impossible to offer the security related service, and control wherein the command of requesting the security related service is not processed in the second applet. For example, the secure element 172 can ignore (or discard) the security-related service request command by using the second applet.

According to an embodiment, the secure element 172 can determine the offering or non-offering of a security related service, on the basis of an interface in which secure state information and a security-related service request command (or signal) are received. For example, when secure state information related to an interface with at least one another component (e.g., the processor 120 or the short range communication module 210) does not satisfy a specified condition, the secure element 172 can ignore the security-related service request command inputted from the corresponding interface, or block the reception of a signal from the corresponding interface. For instance, when the secure state information indicates that the electronic device 101 has been rooted, and an access rule enforcer managing an access authority for the secure element 172 through the short range communication module 210 has been counterfeited, the secure element 172 can determine that it is impossible to offer the security related service, because the security of an SWP being an interface with the short range wireless communication module 210 is weak. When the security of the SWP is weak and thus the security related service offering is impossible, the secure element 172 can ignore the security-related service request command received from the SWP or block wherein a signal is not received from the SWP. For another example, when the secure state information related to the interface with the at least one another component satisfies the specified condition, the secure element 172 can normally process the security-related service request command inputted from the corresponding interface, thereby controlling wherein the requested security related service is offered. For instance, when the secure state information indicates a state in which the electronic device 101 has not been rooted, and an access rule enforcer managing an access authority for the secure element 172 through the short range communication module 210 has not been counterfeited, the secure element 172 can determine that there is not a problem in the security of the SWP being the interface with the short range wireless communication module 210, and normally process the security-related service request command received from the SWP. According to an embodiment, the operating system 220 of the secure element 172 can identify an interface in which the security-related service request command is inputted (or received). The secure element 172 can identify secure state information stored in the repository within the secure element 172 every time point at which the security-related service request command is inputted, and determine the offering or non-offering of the security related service on the basis of the identified secure state information and the interface in which the security-related service request command (or signal) is received.

According to an embodiment, the secure element 172 can receive a command of requesting a security related service from the processor 120. When an applet related to the command of requesting the security related service does not exist, the secure element 172 can directly identify secure state information of the electronic device 101 stored in the internal repository and determine the offering or non-offering of the security related service. For example, the secure element 172 can determine the existence or non-existence of the related applet, on the basis of the security-related service request command. For instance, the security-related service request command can include information (e.g., identification information) of a third application which provides the security-related service request command. On the basis of the information of the third application, the secure element 172 can determine the existence or non-existence of an applet corresponding to the third application. In response to the third application being a finance related application, the secure element 172 can identify that the related applet corresponding to the finance related application does not exist within the secure element 172, on the basis of the application information included in the security-related service request command. In response to the related applet not existing, the secure element 172 can directly identify secure state information stored in the repository within the secure element 172 through an operating system, and determine the offering or non-offering of the security related service on the basis of the identified secure state information. According to an embodiment, the secure element 172 can determine the offering or non-offering of the security related service, on the basis of whether secure history information indicating past secure state information of the electronic device 101 stored in the internal repository, and present secure state information, satisfy a specified condition. The specified condition, for example, can indicate a condition in which the secure history information indicating the past secure state information, and the present secure state information, all have a secure level 0. This is an example, and various embodiments of the present disclosure are not limited to this. When the secure history information indicating the past secure state information and the present secure state information satisfy the specified condition, the secure element 172 can process the security-related service request command, thereby controlling wherein the requested security related service is offered. For example, when the secure history information indicating the past secure state information, and the present secure state information, satisfy the specified condition, the secure element 172 can offer a response signal including security related information (e.g., certificate information) requested by the security-related service request command, to the processor 120. When the secure history information indicating the past secure state information, and the present secure state information, do not satisfy the specified condition, the secure element 172 can determine that the secure state is weak and thus security related service offering is impossible, and ignore (or discard), without normally processing, the security-related service request command.

According to an embodiment, the secure element 172 can transmit a response signal to a command of requesting a security related service. For example, the secure element 172 can offer a response signal indicating that a requested security related service is permitted (or granted) or non-permitted (or denied), to the processor 120. According to an embodiment, in response to it being determined that the offering of the requested security related service is impossible, the secure element 172 can offer a response signal which includes information indicating that the requested security related service has been non-permitted and secure state information, to the processor 120.

According to various embodiments, the short range communication module 210 can receive a signal from an external electronic device (e.g., the electronic device 102) through a short range wireless communication network, and control an active state of the secure element 172 on the basis of the received signal. The short range communication module 210 can determine whether the signal received from the external electronic device is a signal for requesting a specified security related service. When the signal received from the external electronic device is the specified security-related service request signal, the short range communication module 210 can activate the secure element 172, and forward the signal received from the external electronic device, to the secure element 172. In response to the response signal being offered from the secure element 172, the short range communication module 210 can transmit the offered response signal to the external electronic device through the short range wireless communication network.

According to various embodiments, the short range communication module 210 can receive a signal which will be forwarded to the secure element 172, from the processor 120, and forward the received signal to the secure element 172. When the secure element 172 is in an inactive (or sleep) state at a time point at which the signal which will be forwarded to the secure element 172 is received from the processor 120, the short range communication module 210 can control wherein the secure element 172 is activated and thereafter, forward the signal from the processor 120, to the activated secure element 172. The short range communication module 210 can forward a response signal from the secure element 172, to the processor 120.

According to various embodiments, an electronic device (e.g., the electronic device 101 of FIG. 1) can include a processor (e.g., the processor 120 of FIG. 1) for acquiring secure state information of the electronic device 101, and a secure element (e.g., the secure element 172 of FIG. 1) operating under the control of the processor 120, receiving the secure state information of the electronic device 101 from the processor 120, and including a repository for storing the received secure state information of the electronic device. The secure element 172 can obtain a security-related service request command, acquire the secure state information of the electronic device from the repository, and process or ignore the obtained security-related service request command, on the basis of whether the acquired secure state information of the electronic device satisfies a specified condition.

According to various embodiments, the secure state information of the electronic device 101 can include at least one of information about the rooting or non-rooting of the electronic device 101, information about the obtaining or non-obtaining of malware, information about a change or non-change of a warranty bit, information about the counterfeiting or non-counterfeiting of an access rule enforcer, secure state information about a system region of the electronic device, or secure state information about an application installed in the electronic device.

According to various embodiments, the secure state information can indicate at least one of a secure level, or the kind of a secure problem.

According to various embodiments, the specified condition can be determined on the basis of the kind of the security-related service request command.

According to various embodiments, the command of requesting the security related service can be received from the processor 120 or an external electronic device (e.g., the electronic device 102 of FIG. 1).

According to various embodiments, the secure element 172 can normally process the obtained security-related service request command to perform a function corresponding to the command, in response to the acquired secure state information of the electronic device 101 satisfying the specified condition, and ignore the obtained security-related service request command, in response to the acquired secure state information of the electronic device 101 not satisfying the specified condition.

According to various embodiments, the secure element 172 can receive secure state information of an application related to the security-related service request command from the processor 120, acquire secure state information of the application related to the security-related service request command from the secure state information of the electronic device 101 stored in the repository, and process or ignore the obtained security-related service request command, on the basis of whether the received secure state information of the application and the acquired secure state information of the application are consistent with each other.

According to various embodiments, the processor 120 can determine the secure state information of the application at a time point at which the application is installed in the electronic device, and control to transmit the determined secure state information of the application to the secure element 172 wherein it is stored in the repository of the secure element.

According to various embodiments, the secure element 172 can determine whether the secure state information of the electronic device 10 satisfies a condition related to the counterfeiting of an access rule enforcer, and identify an interface corresponding to the obtained security-related service request command, when the secure state information of the electronic device 101 does not satisfy the condition related to the counterfeiting of the access rule enforcer, and ignore the obtained security-related service request command, when the identified interface is an interface corresponding to the counterfeited access rule enforcer, and perform a function corresponding to the obtained security-related service request command, when the identified interface is not the interface corresponding to the counterfeited access rule enforcer.

According to various embodiments, the secure element 172 can offer a response signal to the security-related service request command, to the processor 120 or the external electronic device 102. The response signal can include at least one of information requested by the security-related service request command, information indicating a result of a function performed by the security-related service request command, or information indicating a grant or non-grant of a security related service.

Figure 3:
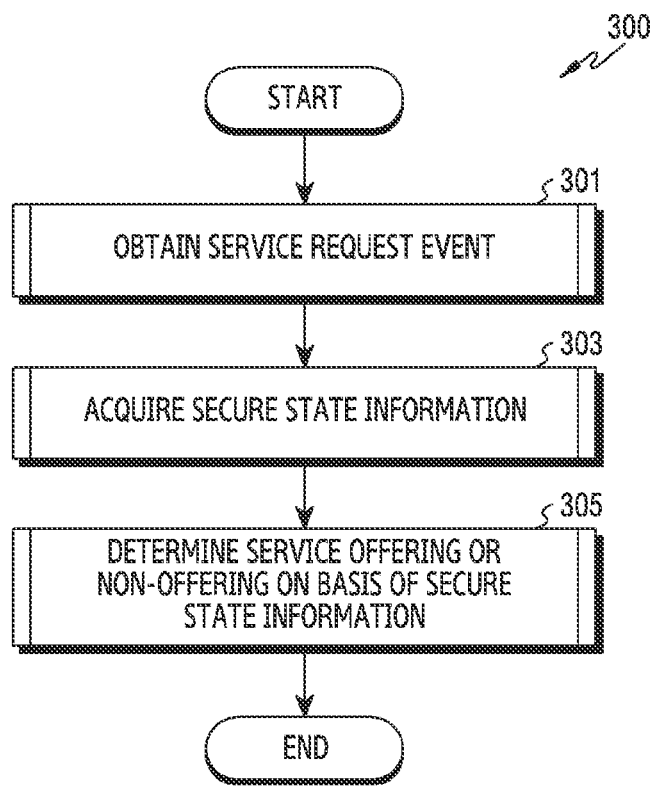
FIG. 3 is a flowchart of offering a security related service on the basis of secure state information of an electronic device in the electronic device according to various embodiments.

FIG. 3 is a flowchart 300 of offering a security related service in an electronic device according to various embodiments. In an embodiment below, respective operations can be performed in sequence as well, but are not necessarily performed in sequence. For example, the order of the respective operations can be changed as well, and at least two operations can be performed in parallel as well. Here, the electronic device can be the electronic device 101 of FIG. 1.

Referring to FIG. 3, the electronic device (e.g., the secure element 172 of FIG. 1) of various embodiments can, in operation 301, obtain a security-related service request event. The security related service can be a service which uses information stored in the secure element 172 or an applet installed in the secure element 172. For example, the security related service can be a service which uses a payment applet, or a transit card applet, installed in the secure element 172. For another example, the security related service can be a service which uses a certificate, or related information, related to a user's status or credential stored in the secure element 172. For instance, when a payment request command using a payment application is received from a processor (e.g., the processor 120 of FIG. 2), or a transit fare payment request command is received from an external electronic device (e.g., the electronic device 102 of FIG. 1), the secure element 172 can determine that a security-related service request event occurs. For another example, when a security-related service request command is received from an interface (e.g., SPI or SWP) for at least one another component (e.g., the processor 120 of FIG. 1 or the short range wireless communication module 210 of FIG. 2), the secure element 172 can determine that the security-related service request event occurs. For further example, when a user authentication request command using a bank application is received from the processor 120, the secure element 172 can determine that the security-related service request event occurs.

The electronic device (e.g., the secure element 172) of various embodiments can, in operation 303, acquire secure state information indicating a secure state of the electronic device. According to an embodiment, the secure element 172 can acquire secure state information stored in a repository within the secure element 172. The secure state information, for example, can include at least one of the rooting or non-rooting of the electronic device 101, the obtaining or non-obtaining of malware, the break or non-break of a warranty bit, the counterfeiting or non-counterfeiting of an access rule enforcer for the secure element 172, secure state information on a system region of the electronic device 101, and secure state information on an application installed in the electronic device 101. The secure state information can be constructed in a form of indicating a secure level (or secure quality) or indicating the kind of a secure problem. For example, the secure level can be previously defined differentially as a step of level 0 to level N. For instance, "secure level N" can be a state in which a secure level is the highest step while the electronic device 101 is safe, and "secure level 0" can be defined as a state in which the secure level is the lowest step while a secure state of the electronic device 101 is very weak. "Secure level N-a" can be defined as a state in which the electronic device 101 is rooted, and "secure level N-b" can be defined as a state in which the electronic device 102 is rooted and an access rule enforcer for the secure element 172 is counterfeited. For another example, the secure state information can be defined to indicate a state in which at least one secure problem among rooting, access rule enforcer counterfeiting, malware obtaining, or warranty bit breaking is obtained. The definition of the secure state information can be determined and/or changed by a service provider and/or a designer. According to an embodiment, the secure state (172) information stored in the repository within the secure element 172 can include secure state information of a present time point, and secure history information indicating secure state information of a past time point. According to an embodiment, the secure state information can be acquired at at least one time point among a real time, a periodical time point, or a specified event occurrence time point by the processor 120 and be stored in the repository within the secure element 172.

The electronic device (e.g., the secure element 172) of various embodiments can, in operation 305, determine service offering or non-offering on the basis of the secure state information. The secure element 172 can determine the service offering or non-offering on the basis of whether the acquired secure state information satisfies a specified condition. According to an embodiment, in response to the acquired secure state information not satisfying the specified condition, the secure element 172 can determine that it is a state in which it is impossible to offer the requested security related service, and operate wherein the requested security related service is not offered. For instance, the secure element 172 can ignore or discard a security-related service request command inputted from at least one another component. According to an embodiment, in response to the acquired secure state information satisfying the specified condition, the secure element 172 can determine that it is a state in which it is possible to offer the requested security related service, and operate wherein the requested security related service is offered. For instance, the secure element 172 can normally process the security-related service request command inputted from at least one another component. According to an embodiment, the specified condition can be determined differently on the basis of the kind of the obtained security-related service request event (or command). For example, when the security-related service request event is obtained by a payment request command which uses a payment applet, the specified condition can include a condition in which security state information (e.g., hash information) of a payment application stored in the repository within the secure element 172 and secure state information of the payment application received from the processor 120 are consistent with each other. For another example, in response to the security-related service request event being obtained by a transit fare payment command which uses a transit card applet, the specified condition can include a condition indicating "not being rooted, and malware not being obtained". For further example, in response to the security-related service request command being received through an SWP interface and the security-related service request event being obtained, the specified condition can include a condition indicating "not being rooted and access rule enforcer not being counterfeited". For yet another example, when a user authentication request command provided using a bank application is received from the processor 120 and the security-related service request event is obtained, the specified condition can include a condition indicating that a present secure level and a past secure level all are 0. The above-described examples are examples for helping the understanding of the present disclosure, and the present disclosure is not limited to these.

Figure 4:
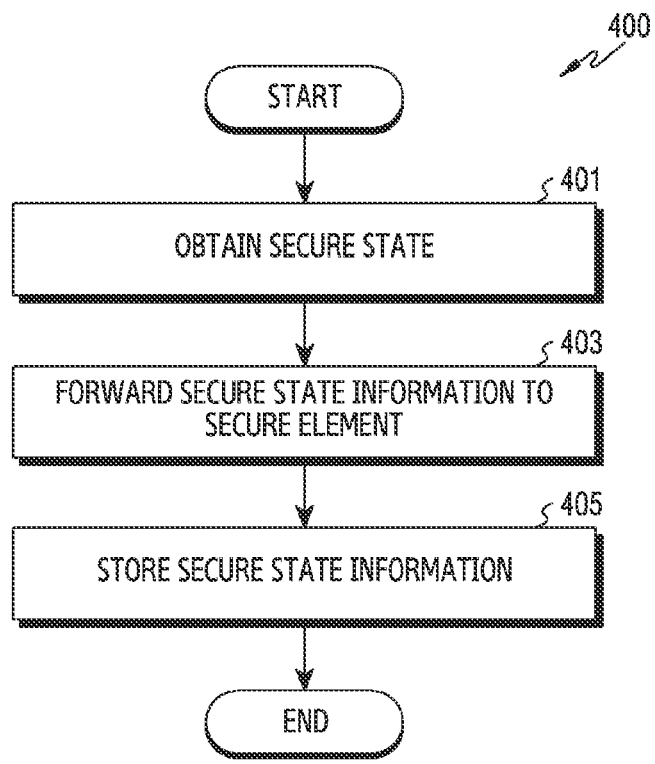
FIG. 4 is a flowchart of storing secure state information of an electronic device in the electronic device according to various embodiments.
Figure 5:
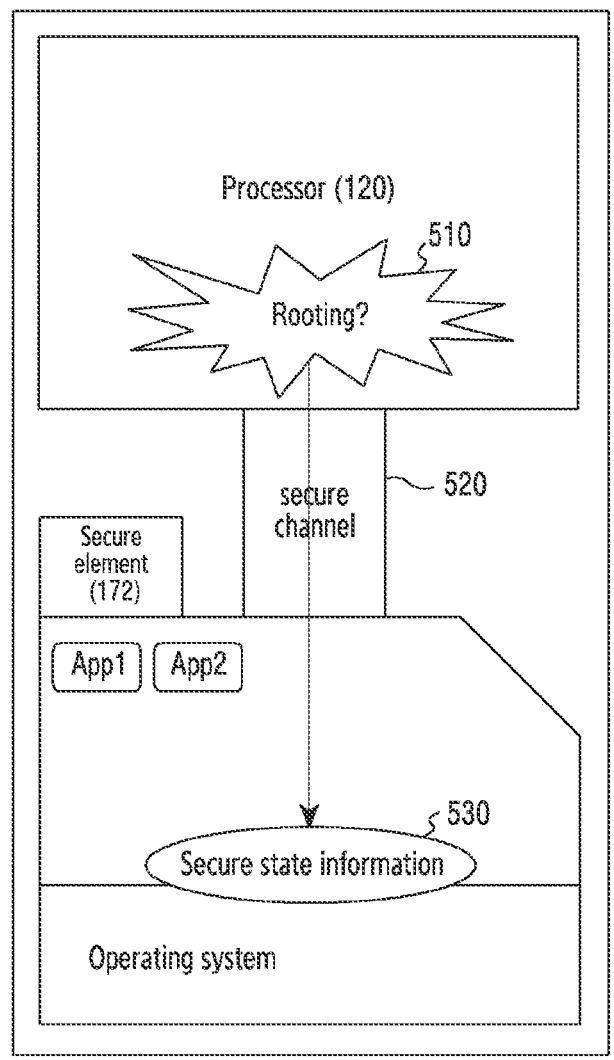
FIG. 5 is an example diagram of storing secure state information of an electronic device in the electronic device according to various embodiments.

FIG. 4 is a flowchart 400 of offering secure state information of an electronic device in the electronic device according to various embodiments. Operations of FIG. 4 described below can be at least a portion of detailed operations of operation 303 of FIG. 3, and can be operations performed before operations of FIG. 3 are performed as well. In an embodiment below, respective operations can be performed in sequence as well, but are not necessarily performed in sequence. For example, the order of the respective operations can be changed as well, and at least two operations can be performed in parallel as well. Here, the electronic device can be the electronic device 101 of FIG. 1. Below, at least a partial operation of FIG. 4 will be described with reference to FIG. 5. FIG. 5 is an example diagram of the storing secure state information of the electronic device in the electronic device according to various embodiments.

Referring to FIG. 4, the electronic device (e.g., the processor 120 of FIG. 1) of various embodiments can, in operation 401, obtain a secure state of the electronic device. The processor 120 can obtain the secure state of the electronic device at a time point corresponding to at least one of a real time, a periodical time point, or a specified event occurrence time point (e.g., a booting time point, a software update time point, and an application installation time point). According to an embodiment, the processor 120 can obtain at least one of the rooting or non-rooting of the electronic device, the obtaining or non-obtaining of malware, a change (break) or non-change of a warranty bit, the counterfeiting or non-counterfeiting of an access rule enforcer for the secure element 172, the obtaining or non-obtaining of an illegal attack to a system region of the electronic device 101, or the obtaining or non-obtaining of an illegal attack to an application installed in the electronic device 101. The processor 120 can obtain the secure state of the electronic device by using a technology known to those skilled in the art, such as the warranty bit. For instance, at booting of the electronic device 101, the processor 120 can check the warranty bit to determine whether a booting image is normal. In response to the warranty bit being changed, the processor 120 can determine that the booting image is abnormal, and determine the secure state of the electronic device as a rooting state. This is an example, and the present disclosure is not limited to this.

According to various embodiments, the electronic device (e.g., the processor 120) can, in operation 403, forward secure state information indicating the obtained secure state of the electronic device, to a secure element (e.g., the secure element 172 of FIG. 1). The processor 120 can provide the secure state information indicating the secure state of the electronic device. The secure state information can include the information explained in FIG. 3 described above. For example, as illustrated in FIG. 5, the processor 120 can forward secure state information 510 indicating whether the electronic device 101 has been rooted, to the secure element 172 through a secure channel 520.

According to various embodiments, the electronic device (e.g., the secure element 172) can, in operation 405, store the secure state information. In response to the secure state information being received from the processor 120, the secure element 172 can store the received secure state information in the repository within the secure element 172. For example, the secure element 172 can store the secure state information of the electronic device in an immutable region within the secure element 172. According to an embodiment, the secure element 172 can add and store the secure state information received from the processor 120 at a present time point, without deleting secure state information stored at a previous time point. For example, the secure element 172 can store the secure state information of the present time point and the secure state information of the past time point in the immutable region, together. According to an embodiment, the secure element 172 can store change history information of the secure state information. For example, as illustrated in FIG. 5, the secure element 172 can store the secure state information 530 indicating whether the electronic device 101 has been rooted, in the repository within the secure element 172.

Figure 6:
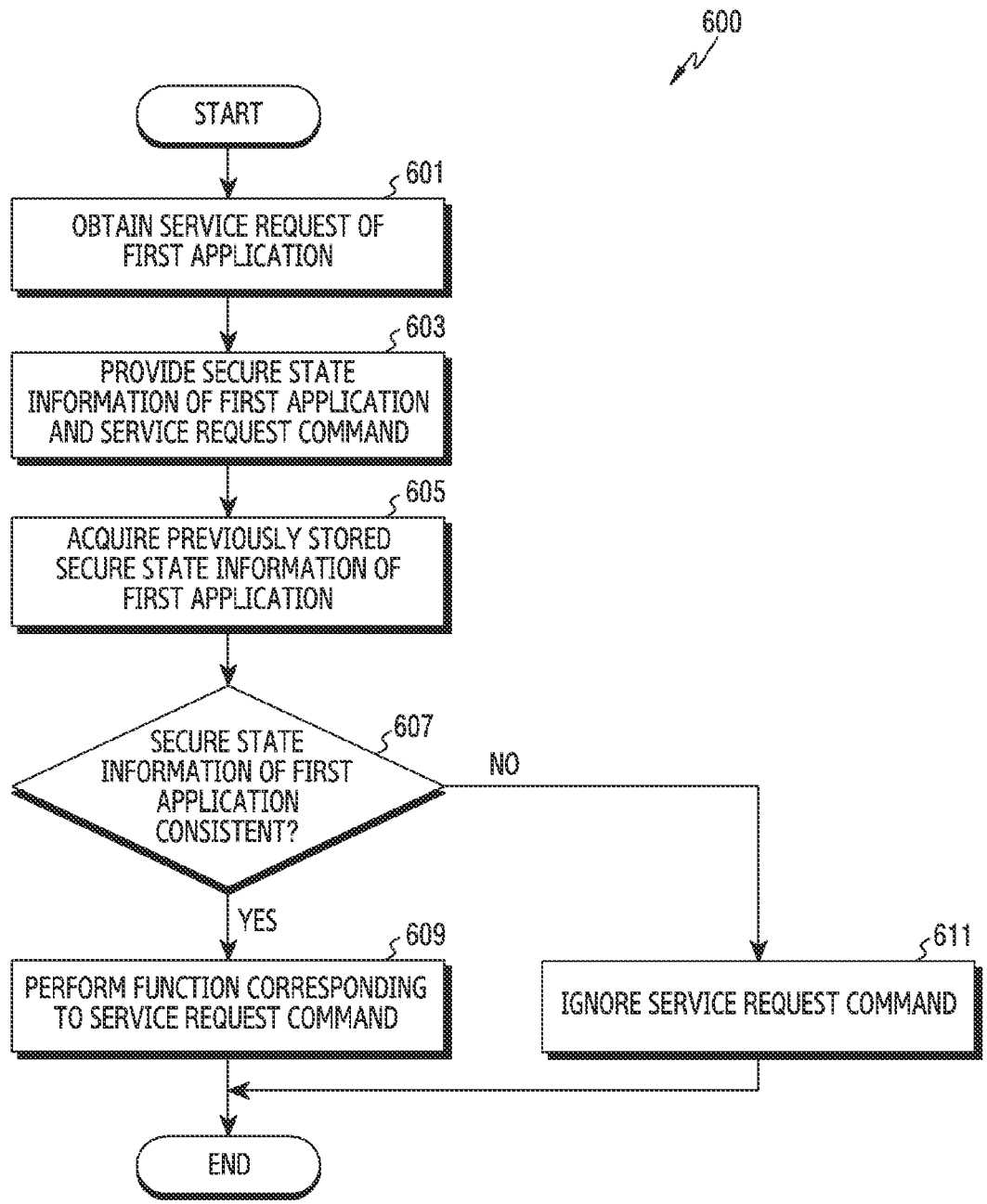
FIG. 6 is a flowchart of offering a security related service which uses an application on the basis of secure state information of an electronic device in the electronic device according to various embodiments.
Figure 7:
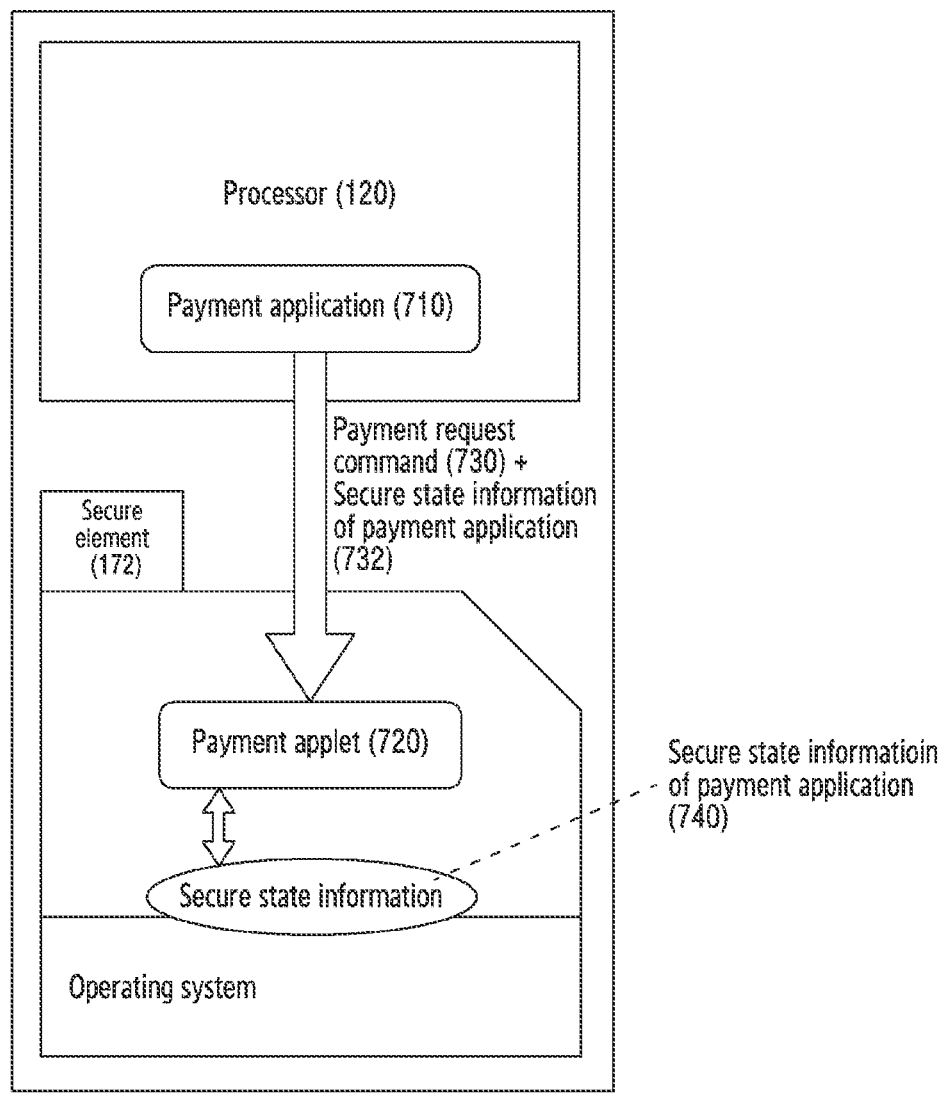
FIG. 7 is an example diagram of offering a security related service which uses an application on the basis of secure state information of an electronic device in the electronic device according to various embodiments.

FIG. 6 is a flowchart 600 of offering a security related service which uses an application on the basis of secure state information of an electronic device in the electronic device according to various embodiments. Operations of FIG. 6 described below can be at least a portion of detailed operations of operations 301, 303, and 305 of FIG. 3. In an embodiment below, respective operations can be performed in sequence as well, but are not necessarily performed in sequence. For example, the order of the respective operations can be changed as well, and at least two operations can be performed in parallel as well. Here, the electronic device can be the electronic device 101 of FIG. 1. Below, at least a partial operation of FIG. 6 will be described with reference to FIG. 7. FIG. 7 is an example diagram of offering the security related service that uses the application on the basis of the secure state information of the electronic device in the electronic device according to various embodiments.

Referring to FIG. 6, the electronic device (e.g., the processor 120 of FIG. 1) of various embodiments can, in operation 601, obtain a security-related service request of a first application. According to an embodiment, the processor 120 can execute the first application on the basis of a first input, and obtain that a security related service is requested on the basis of a second input for the first application which is being executed. The security related service can include the service described in operation 301 of FIG. 3. For example, in response to a payment request event being obtained through a payment application, the processor 120 can obtain that a security-related service request which uses the payment application takes place. For instance, as illustrated in FIG. 7, the processor 120 can obtain a payment request event through a payment application 710 in a state in which the payment application 710 is executed.

According to various embodiments, the electronic device (e.g., the processor 120 of FIG. 1) can, in operation 603, provide secure state information of the first application and a security-related service request command. According to an embodiment, in response to the security-related service request of the first application being obtained, the processor 120 can provide the secure state information of the first application which is presently being executed, and provide the security-related service request command by using the first application. The secure state information of the first application is information necessary for the integrity and/or reliability verification of the first application and, for example, can include hash information. According to an embodiment, the processor 120 can forward the provided secure state information of the first application and the security-related service request command to the secure element 172. For example, as illustrated in FIG. 7, the processor 120 can forward a payment request command 730 and secure state information 732 of the payment application 710 to the secure element 172.

According to various embodiments, the electronic device (e.g., the secure element 172 of FIG. 1) can, in operation 605, acquire previously stored secure state information of the first application. According to an embodiment, in response to a security-related service request command being received, the secure element 172 can execute a first applet on the basis of the security-related service request command, and can acquire the secure state information of the first application previously stored in a repository within the secure element 172 by using the executed first applet. For example, as illustrated in FIG. 7, in response to the payment request command 730 being received, the secure element 172 can execute a payment applet 720 on the basis of the payment request command 730, and identify and acquire secure state information 740 of the payment application 710 stored in the repository within the secure element 172 by using the payment applet 720.

According to various embodiments, the electronic device (e.g., the secure element 172 of FIG. 1) can, in operation 607, compare the previously stored secure state information of the first application and the provided secure state information of the first application, to determine consistency or non-consistency. According to an embodiment, the secure element 172 can compare the secure state information of the first application previously stored in the repository within the secure element 172 and the secure state information of the first application received from the processor 120 by using the first applet, to determine whether the two secure state information are consistent with each other.

According to various embodiments, in response to the previously stored secure state information of the first application and the provided secure state information of the first application being consistent with each other, the electronic device (e.g., the secure element 172 of FIG. 1) can, in operation 609, perform a function corresponding to the security-related service request command. According to an embodiment, in response to the previously stored secure state information of the first application and the provided secure state information of the first application being consistent with each other, the secure element 172 can determine that the integrity and/or reliability of the first application has been verified, and normally process the security-related service request command by using the first applet. For example, as illustrated in FIG. 7, the secure element 172 can perform a payment function corresponding to the payment request command 730 by using the payment applet 720.

According to various embodiments, in response to the previously stored secure state information of the first application and the provided secure state information of the first application not being consistent with each other, the electronic device (e.g., the secure element 172 of FIG. 1) can, in operation 611, ignore the security-related service request command. According to an embodiment, in response to the previously stored secure state information of the first application and the provided secure state information of the first application not being consistent with each other, the secure element 172 can determine that there is not the integrity and/or reliability of the first application, and control wherein the security-related service request command is not processed by using the first applet. For example, the secure element 172 can ignore or discard the payment request command received from the processor 120.

Figure 8:
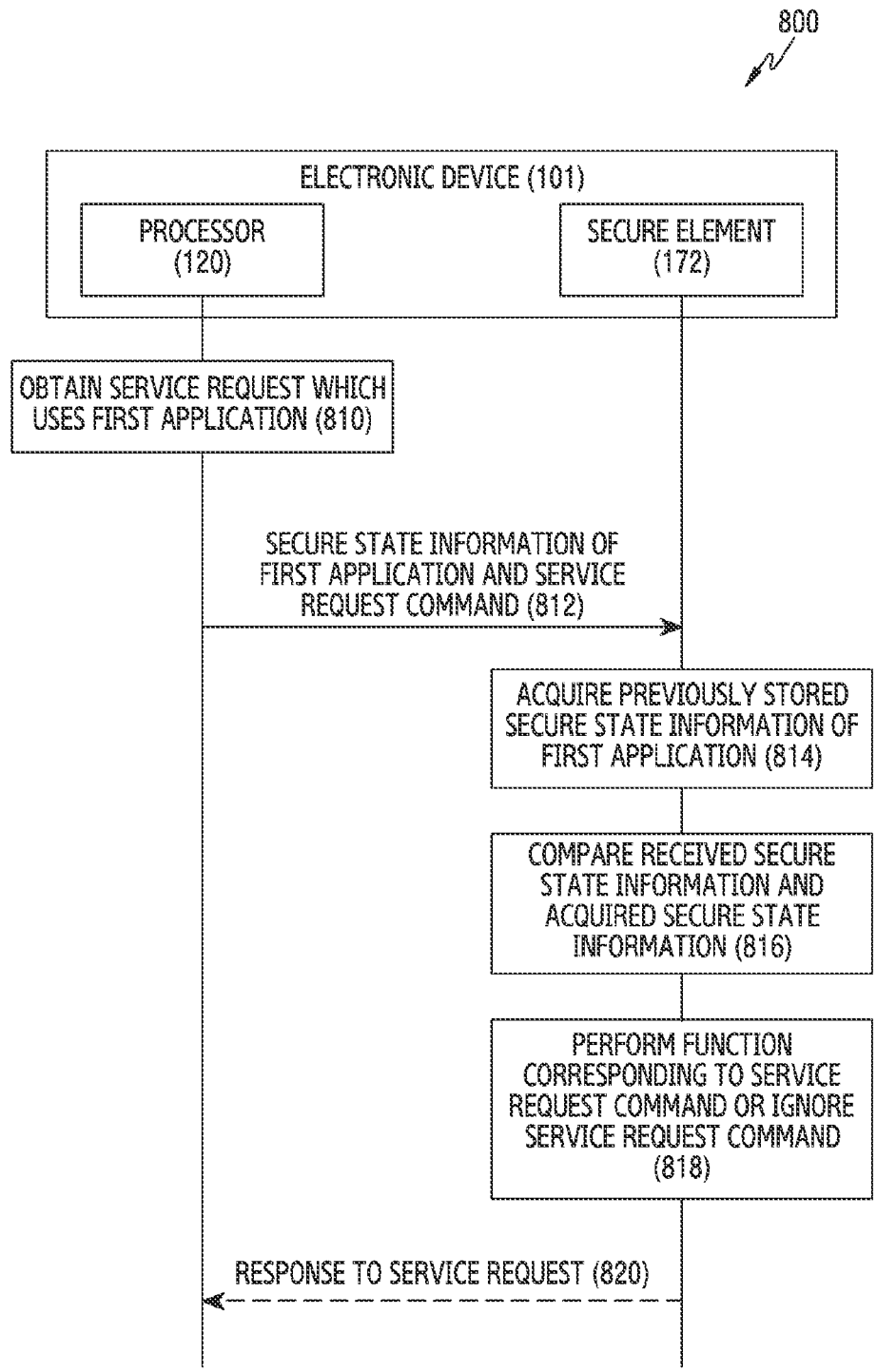
FIG. 8 is a signal flow diagram of offering a security related service which uses an application on the basis of secure state information of an electronic device in the electronic device according to various embodiments.

FIG. 8 is a signal flow diagram 800 of offering a security related service which uses an application on the basis of secure state information of an electronic device in the electronic device according to various embodiments. Operations of FIG. 8 described below can be at least a portion of operations of FIG. 6. Here, the electronic device can be the electronic device 101 of FIG. 1.

Referring to FIG. 8, a processor (e.g., the processor 120 of FIG. 1) of the electronic device 101 of various embodiments can, in operation 810, obtain a security-related service request which uses a first application. According to an embodiment, the processor 120 of the electronic device 101 can obtain that a security related service is requested on the basis of a user input for the first application which is being executed. The operation of obtaining the security-related service request can include operation described in operation 601 of FIG. 6. Below, operation expressed with a dotted line can be omitted according to an embodiment.

According to various embodiments, the processor 120 of the electronic device 101 can, in operation 812, transmit secure state information of the first application and a security-related service request command, to the secure element 172. According to an embodiment, when the security-related service request using the first application is obtained, the processor 120 can provide the security-related service request command by using the first application, and provide the secure state information (e.g., hash information) of the first application. The processor 120 can transmit the provided security-related service request command and the secure state information of the first application to the secure element 172.

According to various embodiments, the secure element 172 of the electronic device 101 can, in operation 814, acquire previously stored secure state information of the first application. According to an embodiment, in response to the security-related service request command and the secure state information of the first application being received, the secure element 172 can execute a first applet on the basis of the received security-related service request command, and can acquire the secure state information of the first application previously stored in a repository within the secure element 172 by using the executed first applet.

According to various embodiments, the secure element 172 of the electronic device 101 can, in operation 816, compare the previously stored secure state information of the first application and the received secure state information of the first application, to determine consistency or non-consistency. According to an embodiment, the secure element 172 can compare the secure state information of the first application previously stored in the repository within the secure element 172 and the secure state information of the first application received from the processor 120 by using the first applet, to determine whether the two secure state information are consistent with each other.

According to various embodiments, the secure element 172 of the electronic device 101 can, in operation 818, perform a function corresponding to the security-related service request command, or ignore the security-related service request command, on the basis of the consistency or non-consistency of the previously stored secure state information of the first application and the provided secure state information of the first application. In response to the previously stored secure state information of the first application and the provided secure state information of the first application being consistent with each other, the secure element 172 can perform the function corresponding to the security-related service request command. In response to the previously stored secure state information of the first application and the provided secure state information of the first application not being consistent with each other, the secure element 172 can ignore the security-related service request command.

According to various embodiments, the secure element 172 of the electronic device 101 can, in operation 820, forward a response signal to the security-related service request, to the processor 120. The response signal can include at least one of information requested by the security-related service request command, information indicating a result of the function performed by the security-related service request command, or information indicating a permission (or grant) or non-permission of a security related service.

Figure 9:
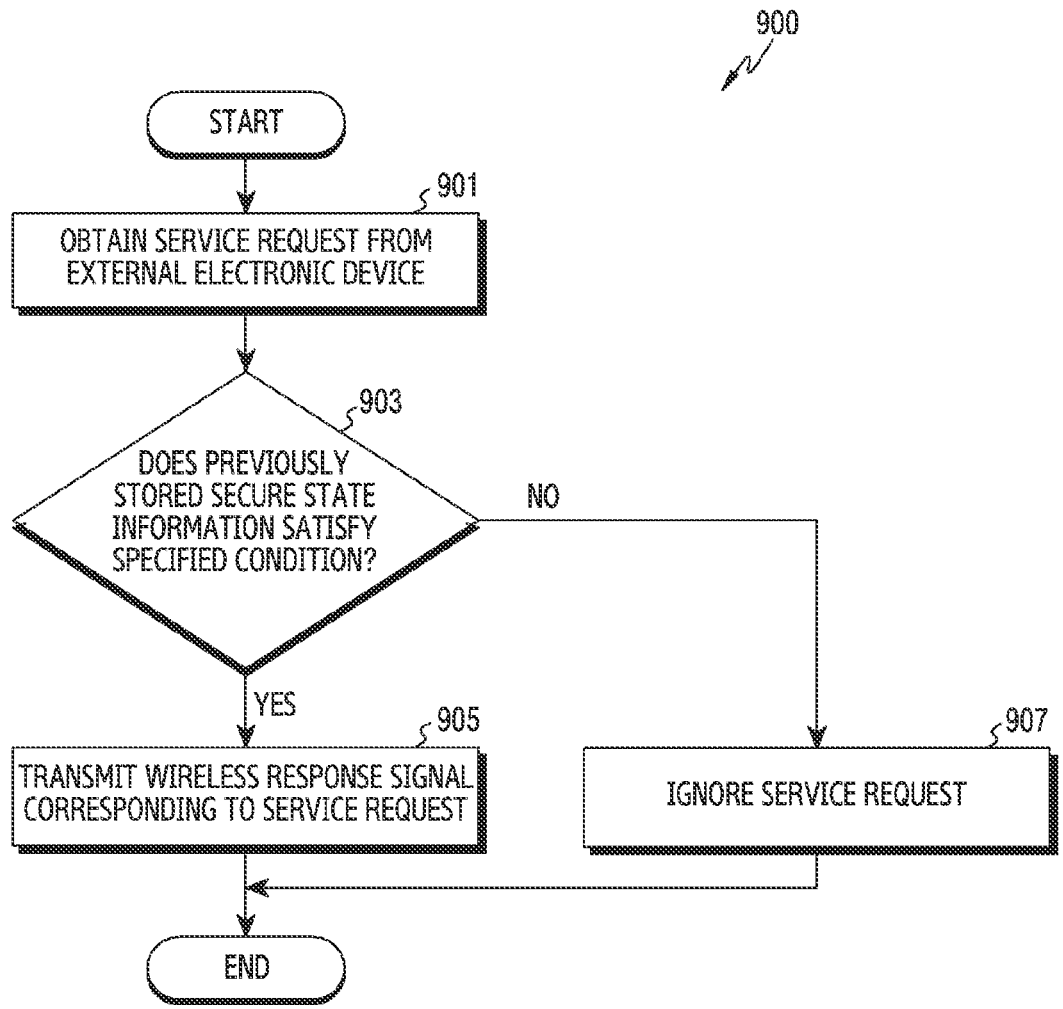
FIG. 9 is a flowchart of offering a service through a wireless interface on the basis of secure state information of an electronic device in the electronic device according to various embodiments.
Figure 10:
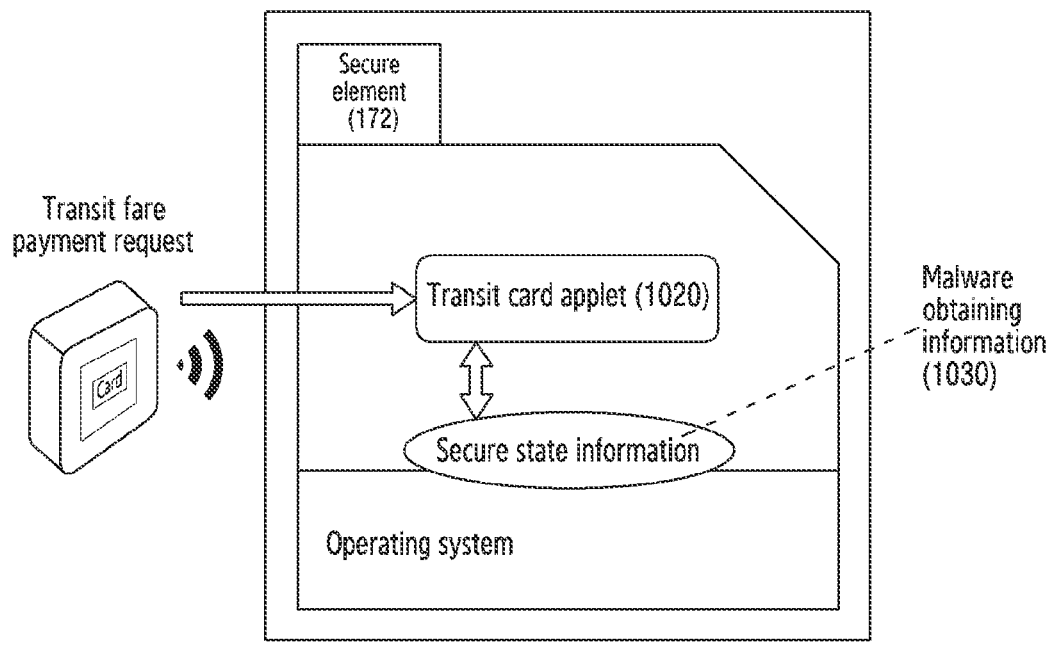
FIG. 10 is an example diagram of offering a service through a wireless interface on the basis of secure state information of an electronic device in the electronic device according to various embodiments.

FIG. 9 is a flowchart 900 of offering a service through a wireless interface on the basis of secure state information of an electronic device in the electronic device according to various embodiments. Operations of FIG. 9 described below can be at least a portion of detailed operations of operations 301, 303, and 305 of FIG. 3. In an embodiment below, respective operations can be performed in sequence as well, but are not necessarily performed in sequence. For example, the order of the respective operations can be changed as well, and at least two operations can be performed in parallel as well. Here, the electronic device can be the electronic device 101 of FIG. 1. Below, at least a partial operation of FIG. 9 will be described with reference to FIG. 10. FIG. 10 is an example diagram of offering a security related service that uses an application on the basis of the secure state information of the electronic device in the electronic device according to various embodiments.

Referring to FIG. 9, the electronic device (e.g., the secure element 172 of FIG. 1) of various embodiments can, in operation 901, obtain a security-related service request from an external electronic device. According to an embodiment, the secure element 172 can receive a security-related service request command (or signal) transmitted from the external electronic device through the processor 120 or a short range communication module (e.g., 210 of FIG. 2). For example, as illustrated in FIG. 10, the secure element 172 can receive a signal of requesting transit fare payment from the external electronic device through the processor 120 or the short range communication module 210.

According to various embodiments, the electronic device (e.g., the secure element 172) can, in operation 903, determine whether previously stored secure state information satisfies a specified condition. According to an embodiment, the secure element 172 can identify the previously stored secure state information by using an applet related to the security-related service request signal, and determine whether the previously stored secure state information satisfies the specified condition. The security-related service request signal can include information (e.g., identification information) indicating the applet related to the security-related service request command. The secure element 172 can execute the related applet, based on the information included in the security-related service request signal received from the external electronic device. For example, as illustrated in FIG. 10, in response to a signal of requesting transit fare payment being received from the external electronic device through the short range communication module 210, the secure element 172 can execute a transit card applet 1020 on the basis of the received transit fare payment request signal. In response to the specified condition being set by "malware not being obtained", the secure element 172 can identify information 1030 indicating the obtaining or non-obtaining of malware in secure state information previously stored in a repository within the secure element 172 by using the transit card applet 1020, to identify whether the specified condition is satisfied. The specified condition is an example, and can be set and changed by a designer and/or a service provider. For example, the specified condition can include a condition for at least one of a secure level, rooting or non-rooting, and access rule enforcer counterfeit or non-counterfeit.

According to various embodiments, in response to the previously stored secure state information satisfying the specified condition, the electronic device (e.g., the secure element 172) can, in operation 905, transmit a response signal corresponding to the security-related service request, to the external electronic device. According to an embodiment, in response to it being identified that the previously stored secure state information satisfies the specified condition, the secure element 172 can determine that a secure state is robust, and determine that security related service offering is possible. The secure element 172 can normally process a command of requesting the security related service by using a second applet, and control wherein the response signal to the security-related service request command is transmitted to the external electronic device. For example, in response to the secure state information indicating that malware is not obtained, the secure element 172 can determine that the specified condition is satisfied, and control wherein a transit fare payment response signal through a short range wireless communication network is transmitted by using the transit card applet 1020.

According to various embodiments, in response to the previously stored secure state information not satisfying the specified condition, the electronic device (e.g., the secure element 172) can, in operation 907, ignore the security-related service request. According to an embodiment, in response to it being identified that the previously stored secure state information does not satisfy the specified condition, the secure element 172 can determine that, because a secure state is weak, it is impossible to offer the security related service, and control wherein the command of requesting the security related service is not processed in the second applet. For example, in response to the secure state information indicating that malware is obtained, the secure element 172 can determine that the specified condition is not satisfied, and control wherein the transit fare payment request through the short range wireless communication network which uses the transit card applet 1020 is not processed. For instance, because malware for monitoring and logging packets transmitted and/or received through the short range wireless communication module (e.g., the short range wireless communication module 210 of FIG. 2) has been installed, the secure element 172 can control wherein a response signal to a transit fare payment request is not transmitted to the external electronic device by using the transit card applet 1020. For another example, because the malware for monitoring and logging the packets transmitted and/or received through the short range wireless communication module 210 has been installed, the secure element 172 can control wherein a response signal of rejecting the payment request is transmitted to the external electronic device through the short range communication network by using the transit card applet 1020. The response signal of rejecting the payment request can include information indicating a reason for rejection to the payment request. For example, the response signal of rejecting the payment request can include an error code indicating secure problem obtaining (e.g., malware obtaining).

Figure 11:
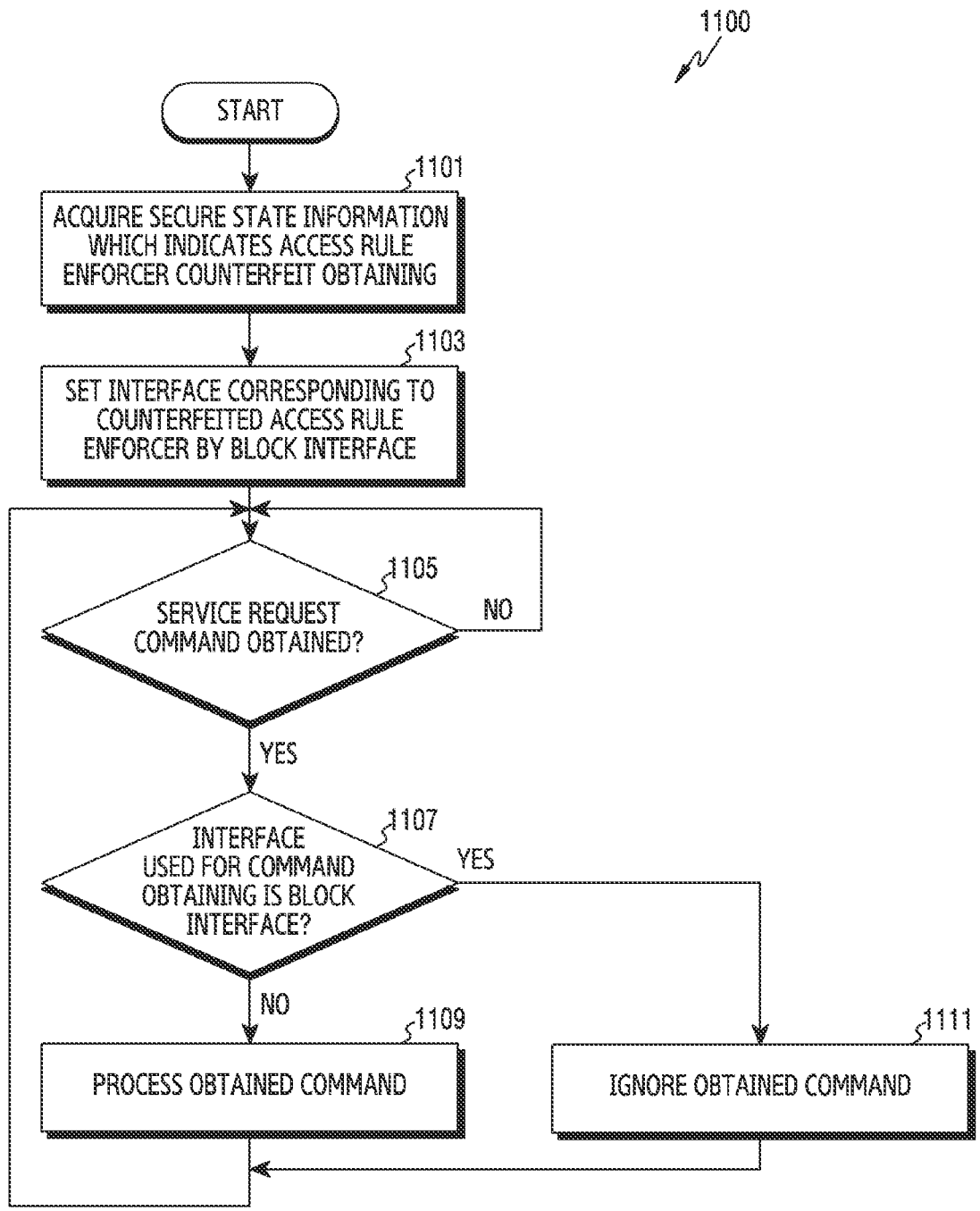
FIG. 11 is a flowchart of controlling an access to a secure element which uses a communication interface on the basis of secure state information of an electronic device in the electronic device according to various embodiments.
Figure 12:
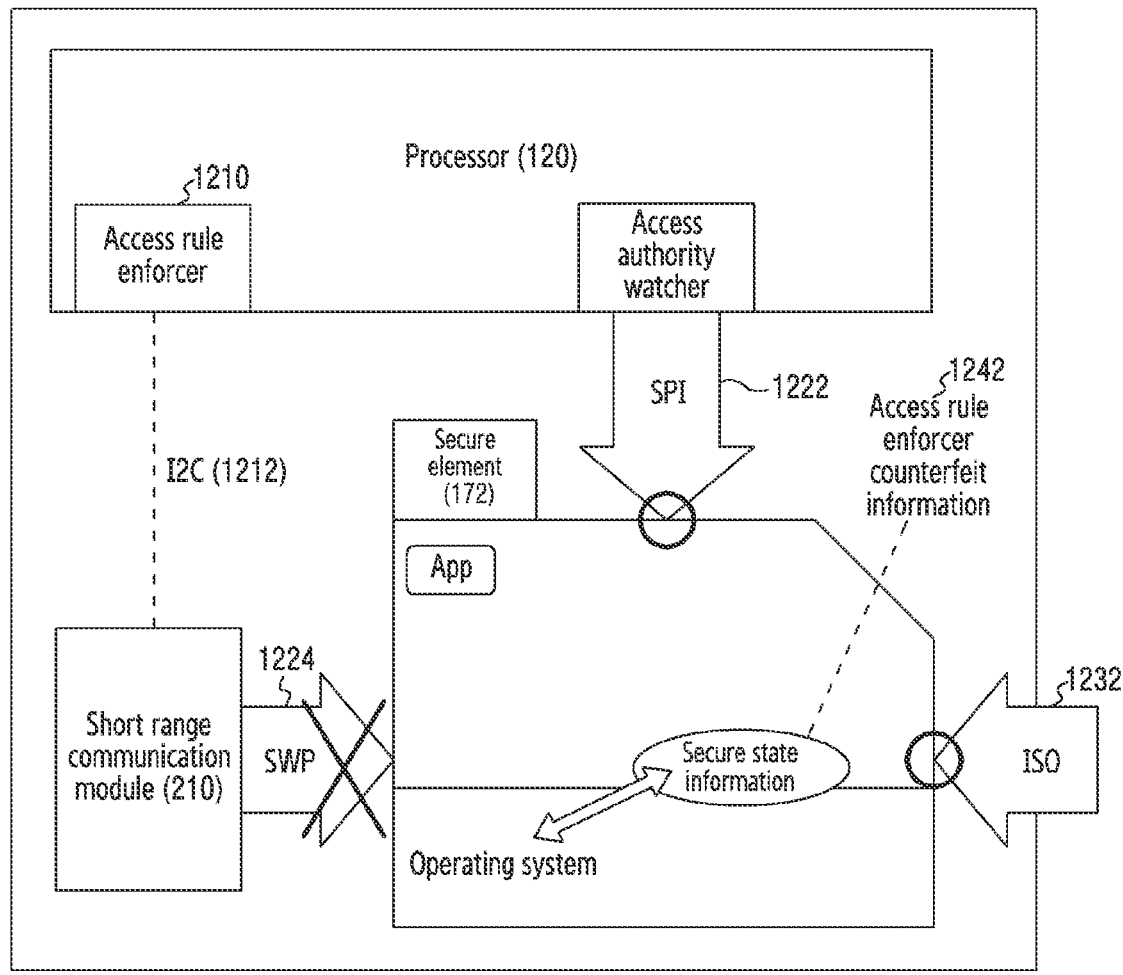
FIG. 12 is an example diagram of controlling an access to a secure element which uses a communication interface on the basis of secure state information of an electronic device in the electronic device according to various embodiments.

FIG. 11 is a flowchart 1100 of controlling an access to a secure element which uses a communication interface on the basis of secure state information of an electronic device in the electronic device according to various embodiments. Operations of FIG. 11 described below can be at least a portion of detailed operations of operations 301, 303, and 305 of FIG. 3. In an embodiment below, respective operations can be performed in sequence as well, but are not necessarily performed in sequence. For example, the order of the respective operations can be changed as well, and at least two operations can be performed in parallel as well. Here, the electronic device can be the electronic device 101 of FIG. 1. Below, at least a partial operation of FIG. 11 will be described with reference to FIG. 12. FIG. 12 is an example diagram of controlling an access to the secure element which uses the communication interface on the basis of the secure state information of the electronic device in the electronic device according to various embodiments.

Referring to FIG. 11, the electronic device (e.g., the secure element 172 of FIG. 1) of various embodiments can, in operation 1101, obtain secure state information indicating that the counterfeiting of an access rule enforcer is obtained. According to an embodiment, the secure element 172 can acquire the secure state information indicating the counterfeiting of the access rule enforcer from secure state information previously stored in an internal repository. For example, as illustrated in FIG. 12, an operating system of the secure element 172 can acquire information 1242 indicating the counterfeiting of an access rule enforcer corresponding to I2C and SWP interfaces from the previously stored secure state information. According to an embodiment, the secure element 172 can receive the secure state information indicating the counterfeiting of the access rule enforcer for the secure element 172 from the processor 120. The access rule enforcer can include an access authority for controlling an access to the secure element 172.

According to various embodiments, the electronic device (e.g., the secure element 172) can, in operation 1103, set an interface corresponding to the counterfeited access rule enforcer by a block interface. The secure element 172 can identify the interface corresponding to the counterfeited access rule enforcer, and set the identified interface by the block interface. For example, as illustrated in FIG. 12, the secure element 172 can identify that the interface corresponding to the counterfeited access rule enforcer is an SWP 1224 among the SWP 1224, an SPI 1222, or an ISO 1232, which is an interface between at least one another component and the secure element 172, and set the SWP 1224 by the block interface which will block a communication.

According to various embodiments, the electronic device (e.g., the secure element 172) can, in operation 1105, determine whether a command of requesting a security related service is obtained. According to an embodiment, the operating system of the secure element 172 can obtain the security-related service request command inputted to the secure element 172 through at least one interface.

According to various embodiments, the electronic device (e.g., the secure element 172) can, in operation 1107, determine whether an interface used for command obtaining is the block interface. According to an embodiment, in response to the security-related service request command inputted to the secure element 172 being obtained, the operating system of the secure element 172 can determine whether the interface in which the security-related service request command is inputted is the block interface. For example, as illustrated in FIG. 12, the secure element 172 can determine whether the obtained security-related service request command has been inputted through the SWP 1224 set as the block interface.

According to various embodiments, when the interface used for the command obtaining is not the block interface, the electronic device (e.g., the secure element 172) can, in operation 1109, normally process the obtained command.

According to an embodiment, when the security-related service request command is inputted through another interface which is not the block interface, the operating system of the secure element 172 can normally process the inputted security-related service request command. For example, as illustrated in FIG. 12, when the security-related service request command is inputted through the SPI 1222 or the ISO 1232, the operating system of the secure element 172 can normally process the inputted security-related service request command.

According to various embodiments, when the interface used for the command obtaining is the block interface, the electronic device (e.g., the secure element 172) can, in operation 1111, ignore the obtained command. According to an embodiment, when the security-related service request command is inputted through the block interface, the operating system of the secure element 172 can ignore, without processing, the inputted security-related service request command. For example, as illustrated in FIG. 12, when the access rule enforcer 1210 is counterfeited, a non-permitted application can attempt an access to the secure element 172 by using the counterfeited access rule enforcer, so the secure element 172 can ignore the security-related service request command inputted through the SWP 1224.

Figure 13:
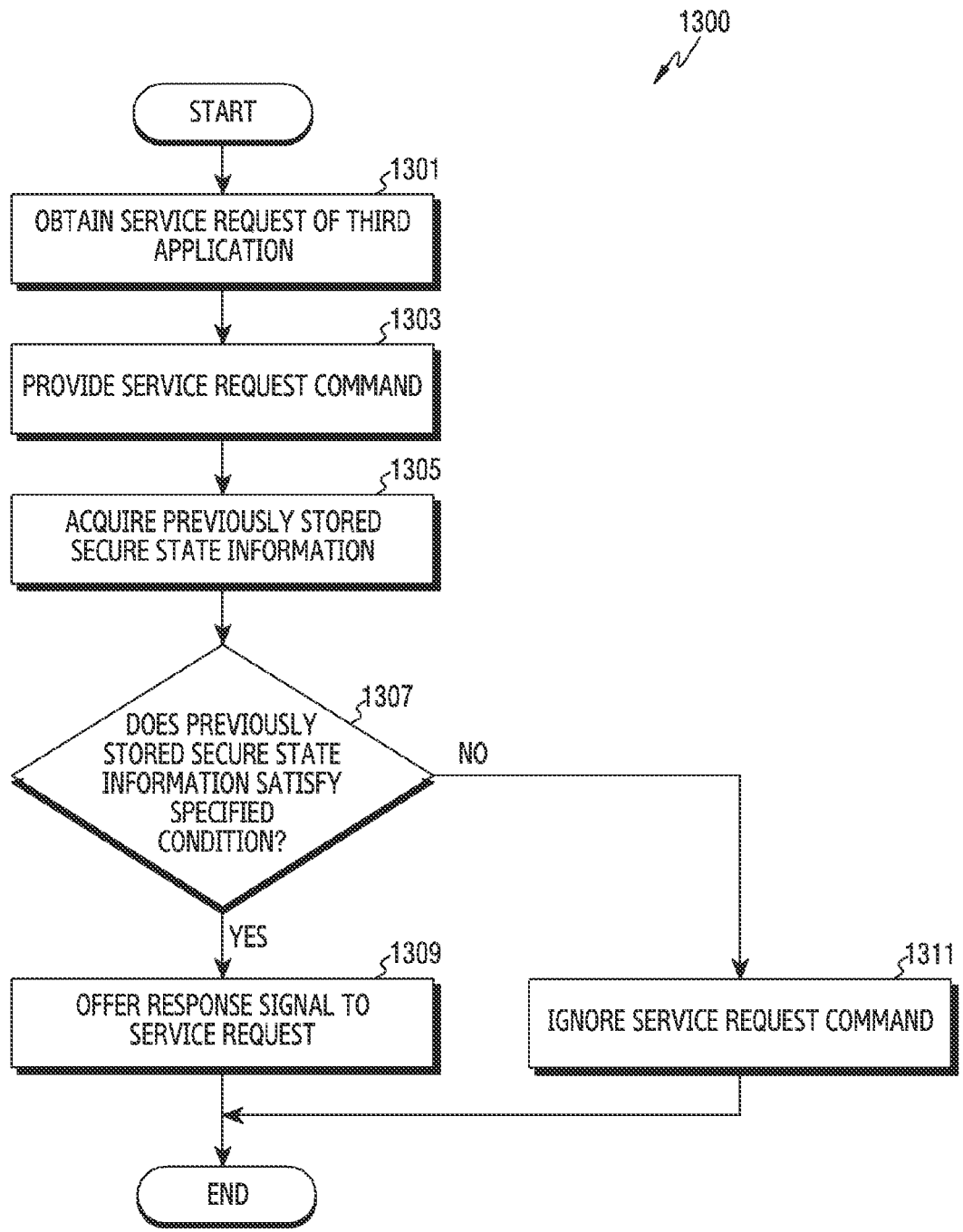
FIG. 13 is a flowchart of offering security related information on the basis of secure state information of an electronic device in the electronic device according to various embodiments.
Figure 14:
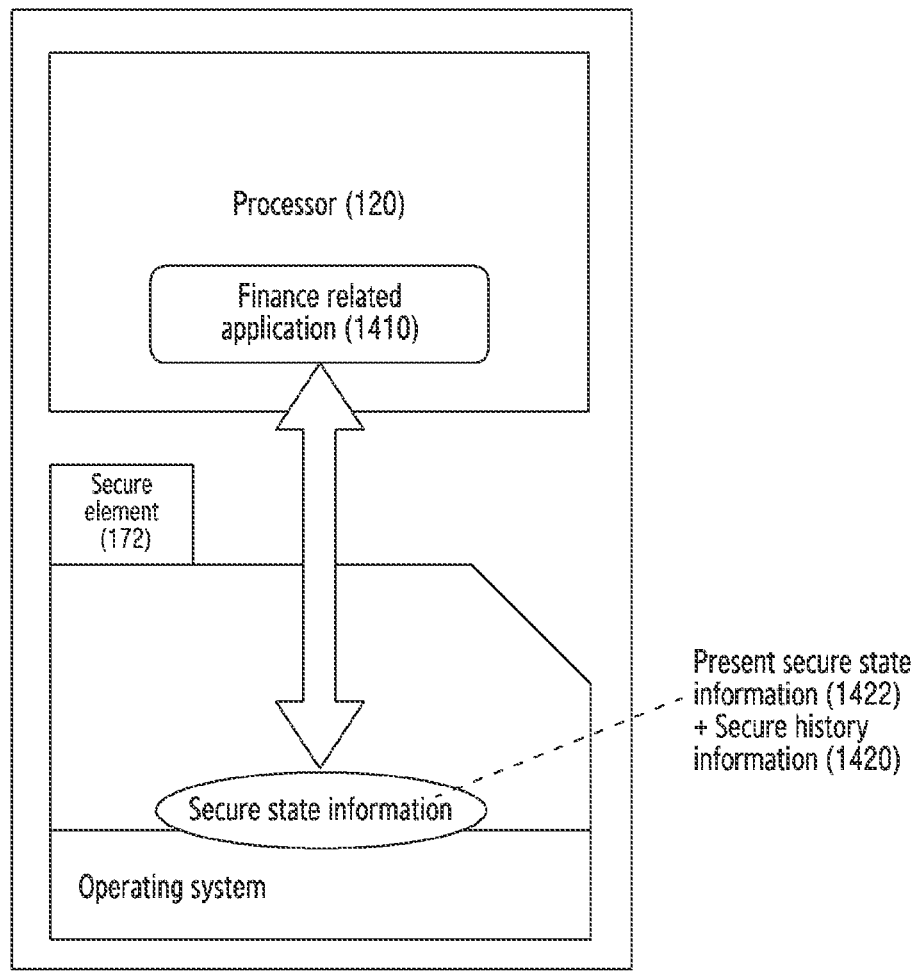
FIG. 14 is an example diagram of offering security related information on the basis of secure state information of an electronic device in the electronic device according to various embodiments.

FIG. 13 is a flowchart 1300 of offering security related information on the basis of secure state information of an electronic device in the electronic device according to various embodiments. Operations of FIG. 13 described below can be at least a portion of detailed operations of operations 301, 303, and 305 of FIG. 3. In an embodiment below, respective operations can be performed in sequence as well, but are not necessarily performed in sequence. For example, the order of the respective operations can be changed as well, and at least two operations can be performed in parallel as well. Here, the electronic device can be the electronic device 101 of FIG. 1. Below, at least a partial operation of FIG. 13 will be described with reference to FIG. 14. FIG. 14 is an example diagram of offering the security related information on the basis of the secure state information of the electronic device in the electronic device according to various embodiments.

Referring to FIG. 13, the electronic device (e.g., the processor 120 of FIG. 1) of various embodiments can, in operation 1301, obtain a security-related service request of a third application. According to an embodiment, the processor 120 can execute the third application on the basis of a first input, and obtain that a security related service is requested on the basis of a second input for the third application which is being executed. The security related service can include the service described in operation 301 of FIG. 3. For example, in response to an authentication request event being obtained through a finance related application, the processor 120 can obtain that a security-related service request which uses the finance related application occurs. For instance, as illustrated in FIG. 14, the processor 120 can obtain a user authentication request event in a state in which a finance related application 1410 is executed.

According to various embodiments, the electronic device (e.g., the processor 120) can, in operation 1303, provide a security-related service request command. According to an embodiment, the processor 120 can provide the security-related service request command by using the third application. For example, the processor 120 can provide a user authentication request command by using the finance related application. According to an embodiment, the security-related service request command can include information (e.g., identification information) of the finance related application.

According to various embodiments, the electronic device (e.g., the secure element 172) can, in operation 1305, acquire previously stored secure state information. According to an embodiment, in response to the security-related service request command being received from the processor 120, the secure element 172 can acquire the secure state information stored in a repository within the secure element 172. The secure element 172 can determine that a related applet does not exist, based on the security-related service request command. For example, the secure element 172 can determine that an applet corresponding to the third application does not exist, on the basis of the information included in the security-related service request command. The secure element 172 can acquire the secure state information stored in the repository within the secure element 172 by using an operating system.

According to various embodiments, the electronic device (e.g., the secure element 172) can, in operation 1307, determine whether the previously stored secure state information satisfies a specified condition. According to an embodiment, the secure element 172 can determine the offering or non-offering of a security related service, on the basis of whether secure history information indicating past secure state information of the electronic device 101 stored in the internal repository, and present secure state information, satisfy the specified condition. For instance, as illustrated in FIG. 14, the secure element 172 can acquire present secure state information 1422 and secure history information 1420 from the internal repository, and determine whether the acquired information satisfy the specified condition. The specified condition, for example, can indicate a condition in which the secure history information indicating the past secure state information and the present secure state information all have a secure level 0. This is an example, and various embodiments of the present disclosure are not limited to this. For example, the specified condition can be a condition for rooting or non-rooting, and malware obtaining or non-obtaining. The secure element 172 can acquire secure state information from the repository within the secure element 172, on the basis of the specified condition, and determine whether the acquired secure state information satisfies the specified condition.

According to various embodiments, in response to the previously stored secure state information satisfying the specified condition, the electronic device (e.g., the secure element 172) can, in operation 1309, offer a response signal to the security-related service request. According to an embodiment, in response to the present secure state information and the secure history information satisfying the specified condition, the secure element 172 can process the security-related service request command, thereby controlling wherein the requested security related service is offered. For example, the secure element 172 can offer a response signal including security related information (e.g., certificate information) requested by the security-related service request command, to the processor 120.

According to various embodiments, in response to the previously stored secure state information not satisfying the specified condition, the electronic device (e.g., the secure element 172) can, in operation 1311, ignore the security-related service request command. According to an embodiment, in response to the present secure state information and the secure history information not satisfying the specified condition, the secure element 172 can ignore the security-related service request command, thereby controlling wherein the requested security related service is not offered. When the secure history information indicating the past secure state information, and the present secure state information, do not satisfy the specified condition, the secure element 172 can offer a response signal indicating that the service is impossible due to a secure state, to the processor 120.

Figure 15:
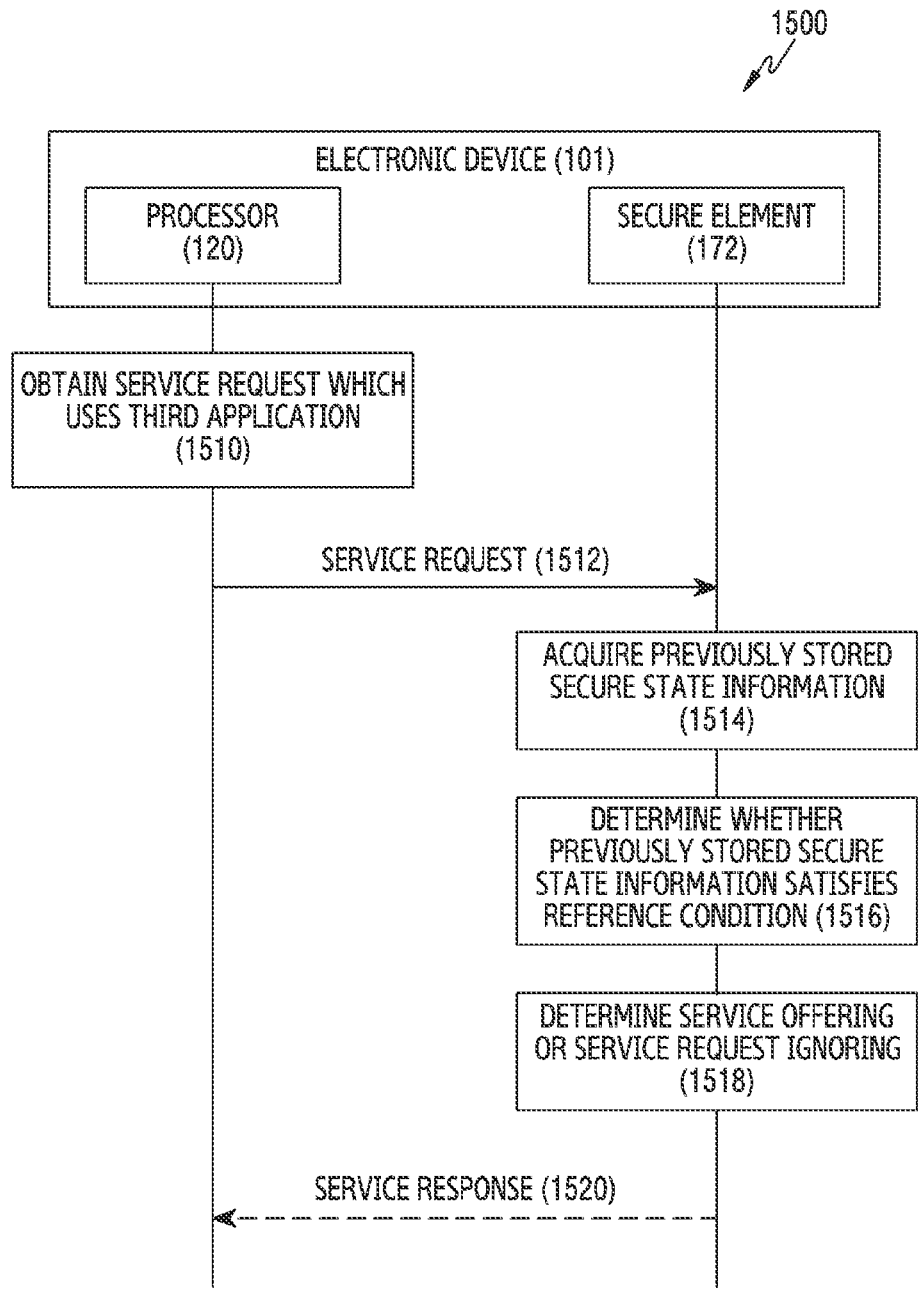
FIG. 15 is a signal flow diagram of offering security related information on the basis of secure state information of an electronic device in the electronic device according to various embodiments.

FIG. 15 is a signal flow diagram 1500 of offering security related information on the basis of secure state information of an electronic device in the electronic device according to various embodiments. Operations of FIG. 15 described below can be at least a portion of operations of FIG. 13. Here, the electronic device can be the electronic device 101 of FIG. 1. Below, operation expressed with a dotted line can be omitted according to an embodiment.

Referring to FIG. 15, a processor (e.g., the processor 120 of FIG. 1) of the electronic device 101 of various embodiments can, in operation 1510, obtain a security-related service request which uses a third application. According to an embodiment, the processor 120 of the electronic device 101 can obtain that a security related service is requested on the basis of a user input for the third application which is being executed. The operation of obtaining the security-related service request can include operation described in operation 1301 of FIG. 13.

According to various embodiments, the processor 120 of the electronic device 101 can, in operation 1512, transmit a security-related service request command to a secure element (e.g., the secure element 172 of FIG. 1). According to an embodiment, when the security-related service request using the third application is obtained, the processor 120 can provide the security-related service request command by using the third application, and transmit the provided security-related service request command to the secure element 172.

According to various embodiments, the secure element 172 of the electronic device 101 can, in operation 1514, acquire previously stored secure state information. According to an embodiment, in response to the security-related service request command being received from the processor 120, the secure element 172 can determine that a related applet does not exist, based on the received security-related service request command. For example, the secure element 172 can determine that an applet corresponding to the third application does not exist, on the basis of information included in the security-related service request command. The secure element 172 can acquire the secure state information stored in the repository within the secure element 172 by using an operating system. For example, the secure element 172 can acquire secure state information including present secure state information and secure history information from the internal repository.

According to various embodiments, the secure element 172 of the electronic device 101 can, in operation 1516, determine whether the previously stored secure state information satisfies a specified condition. According to an embodiment, the secure element 172 can determine whether the present secure state information and the secure history information satisfy the specified condition. The specified condition, for example, can indicate a condition in which the present secure state information and the secure history information all have a secure level 0. This is an example, and various embodiments of the present disclosure are not limited to this. For example, the specified condition can be a condition for rooting or non-rooting, and malware obtaining or non-obtaining. The secure element 172 can acquire the secure state information related to the specified condition from the repository within the secure element 172, and determine whether the acquired secure state information satisfies the specified condition.

According to various embodiments, the secure element 172 of the electronic device 101 can, in operation 1518, determine to offer the security related service, or ignore the security-related service request command, on the basis of whether the previously stored secure state information satisfies the specified condition. In response to the previously stored secure state information satisfying the specified condition, the secure element 172 can normally process the security-related service request command, to allow wherein the requested security related service is offered. In response to the previously stored secure state information not satisfying the specified condition, the secure element 172 can ignore the security-related service request command, to allow wherein the requested security related service is not offered.

According to various embodiments, the secure element 172 of the electronic device 101 can, in operation 1520, forward a response signal to the service request, to the processor 120. The response signal can include at least one of information requested by the security-related service request command, information indicating a result of a function performed by the security-related service request command, or information indicating a permission (or grant) or non-permission of the security related service.

In the above-described various embodiments, a description has been made in which the secure element 172 of the electronic device 101 stores secure state information indicating a secure state of the electronic device 101, and determines the offering or non-offering of a security related service by using this. However, according to various embodiments, the secure element 172 of the electronic device 101 can store secure state information of at least one external electronic device (e.g., the electronic device 102 of FIG. 1). For example, the secure element 172 can store at least one of the rooting or non-rooting of at least one external electronic device 102, malware obtaining or non-obtaining of the at least one external electronic device 102, the change or non-change of a warranty bit of the at least one external electronic device 102, the counterfeit or non-counterfeit of an access rule enforcer for the secure element 172 of the at least one external electronic device 102, secure state information on a system region of the at least one external electronic device 102, or secure state information on an application installed in the at least one external electronic device 102. The electronic device 101 can receive a security-related service request command (or signal) from the at least one external electronic device through the processor 120 and/or the communication module 190, and determine whether to offer the security related service requested from the at least one external electronic device, through the secure element 172, on the basis of secure state information of the at least one external electronic device stored in a repository within the secure element 172. For example, the secure element 172 of the electronic device 101 can normally process, or ignore, the security-related service request command, on the basis of the secure state information of the at least one external electronic device previously stored in the internal repository.

According to various embodiments, an operating method of an electronic device (e.g., the electronic device 101 of FIG. 1) can include acquiring, by a processor (e.g., the processor 120 of FIG. 1), secure state information of the electronic device, storing, by a secure element operating under the control of the processor 120, the secure state information of the electronic device in a repository within the secure element (e.g., the secure element 172 of FIG. 1), obtaining, by the secure element 172, a security-related service request command, acquiring, by the secure element 172, the secure state information of the electronic device stored in the internal repository, and processing or ignoring, by the secure element 172, the obtained security-related service request command, on the basis of whether the acquired secure state information of the electronic device satisfies a specified condition.

According to various embodiments, the secure state information of the electronic device can include at least one of information about the rooting or non-rooting of the electronic device, information about the obtaining or non-obtaining of malware, information about a change or non-change of a warranty bit, information about the counterfeiting or non-counterfeiting of an access rule enforcer, secure state information about a system region of the electronic device, or secure state information about an application installed in the electronic device.

According to various embodiments, the secure state information can indicate at least one of a secure level, or the kind of a secure problem.

According to various embodiments, the specified condition can be determined on the basis of the kind of the security-related service request command.

According to various embodiments, the command of requesting the security related service can be received from the processor 120 or an external electronic device (e.g., the electronic device 102 of FIG. 1).

According to various embodiments, processing or ignoring, by the secure element 172, the obtained security-related service request command can include normally processing, by the secure element 172, the obtained security-related service request command to perform a function corresponding to the command, when the acquired secure state information of the electronic device satisfies the specified condition, and ignoring, by the secure element 172, the obtained security-related service request command, when the acquired secure state information of the electronic device does not satisfy the specified condition.

According to various embodiments, the method can further include receiving, by the secure element 172, secure state information of an application related to the security-related service request command from the processor 120. Processing or ignoring, by the secure element 172, the obtained security-related service request command can include identifying, by the secure element 172, secure state information of the application related to the security-related service request command from acquired secure state information, and processing or ignoring, by the secure element 172, the obtained security-related service request command, on the basis of whether the received secure state information of the application and the identified secure state information of the application are consistent with each other.

According to various embodiments, the method can further include determining, by the processor 120, the secure state information of the application at a time point at which the application is installed in the electronic device, and controlling, by the processor 120, to transmit the determined secure state information of the application to the secure element 172 wherein it is stored in the repository of the secure element 172.

According to various embodiments, processing or ignoring, by the secure element 172, the obtained security-related service request command can include determining, by the secure element 172, whether the secure state information of the electronic device satisfies a condition related to the counterfeiting of an access rule enforcer, and identifying, by the secure element 172, an interface corresponding to the obtained security-related service request command, when the secure state information of the electronic device does not satisfy the condition related to the counterfeiting of the access rule enforcer, and ignoring, by the secure element 172, the obtained security-related service request command, when the identified interface is an interface corresponding to the counterfeited access rule enforcer, and performing, by the secure element 172, a function corresponding to the obtained security-related service request command, when the identified interface is not the interface corresponding to the counterfeited access rule enforcer.

According to various embodiments, the method can further include offering, by the secure element 172, a response signal to the security-related service request command, to the processor 120 or the external electronic device 102. The response signal can include at least one of information requested by the security-related service request command, information indicating a result of a function performed by the security-related service request command, or information indicating a grant or non-grant of a security related service.

The electronic device of various embodiments disclosed in the present document can be various types of devices. The electronic device, for example, can include a portable communication device (e.g., a smart phone), a computer device, a portable multimedia device, a portable medical device, a camera, a wearable device, or a home appliance. The electronic device of an embodiment of the present document is not limited to the aforementioned devices.

It should be appreciated that various embodiments of the present document and the terms used therein are not intended to limit the technological features set forth herein to particular embodiments and include various changes, equivalents, or replacements for a corresponding embodiment. With regard to the description of the drawings, similar reference symbols can be used to refer to similar or related components. A singular form of a noun corresponding to an item can include one item or more, unless the relevant context clearly indicates otherwise. In the document, each of such phrases as "A or B", "at least one of A and B", "at least one of A or B," "A, B, or C", "at least one of A, B, and C", and "at least one of A, B, or C" can include any one of the items enumerated together in a corresponding one of the phrases, or all possible combinations thereof. Such terms as "a first", "a second", or "the first" or "the second" can be used to simply distinguish a corresponding component from another corresponding component, and does not limit the corresponding components in another aspect (e.g., importance or sequence). If some (e.g., a first) component is referred to, with or without the term "operatively" or "communicatively", as "coupled with", "coupled to", "connected with", or "connected to" another (e.g., a second) component, it means that the component can be connected with the another component directly (e.g., wiredly), wirelessly, or via a third component.

The term "module" used in the present document can include a unit implemented in hardware, software, or firmware, and can interchangeably be used with terms, for example, logic, logic block, part, circuitry or the like. The module can be a single integral part, or a minimum unit of the part or a portion thereof, adapted to perform one or more functions. For example, according to an embodiment, the module can be implemented in the form of an application-specific integrated circuit (ASIC).

Various embodiments of the present document can be implemented as software (e.g., the program 140) which includes one or more instructions stored in a machine (e.g., the electronic device 101)—readable storage medium (e.g., the internal memory 136 or the external memory 138). For example, a processor (e.g., the processor 120) of a machine (e.g., the electronic device 101) can invoke at least one of the one or more instructions stored in the storage medium, and execute it. This allows the machine to be operated to perform at least one function according to the at least one instruction invoked. The one or more instructions can include a code provided by a compiler or a code executable by an interpreter. The machine-readable storage medium can be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method of various embodiments disclosed in the present document can be included and offered in a computer program product. The computer program product can be traded as a product between a seller and a buyer. The computer program product can be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least one portion of the computer program product can be at least temporarily stored, or temporarily provided in the machine-readable storage medium, such as a memory of a manufacturer's server, a server of an application store, or a relay server.

According to various embodiments, each component (e.g., a module or a program) of the above-described components can include a single entity or multiple entities. According to various embodiments, one or more of the above-described components or operations can be omitted, or one or more other components or operations can be added. Alternatively or additionally, multiple components (e.g., modules or programs) can be integrated into a single component. In such a case, the integrated component can perform one or more functions of each of the multiple components in the same or similar manner as they are performed by a corresponding one of the multiple components before the integration. According to various embodiments, operations performed by the module, the program, or another component can be carried out sequentially, in parallel, repeatedly, or heuristically, or one or more of the operations can be executed in a different sequence or omitted, or one or more other operations can be added.

The invention claimed is:

1. An electronic device comprising:
a processor configured to acquire secure state information of the electronic device; and
a secure element operating under the control of the processor, receiving secure state information of the electronic device from the processor, and including a repository for storing the acquired secure state information of the electronic device, wherein the secure state information includes at least one of a secure level of the electronic device or a kind of a secure problem of the electronic device,
wherein the secure element:
obtains a security-related service request command,
executes an applet corresponding to the application based on the security-related service request command,
acquires the secure state information of the electronic device from the repository, and
processes or ignores the obtained security-related service request command using the applet, on the basis of whether the acquired secure state information of the electronic device satisfies a specified condition,
wherein, in response to the acquired secure state information of the electronic device satisfying the specified condition, the secure element normally processes the obtained security-related service request command to perform a function corresponding to the command and, in
wherein, in response to the acquired secure state information of the electronic device not satisfying the specified condition, the secure element ignores the obtained security-related service request command.

2. The electronic device of claim 1, wherein the secure state information of the electronic device comprises at least one of information about the rooting or non-rooting of the electronic device, information about the obtaining or non-obtaining of malware, information about a change or non-change of a warranty bit, information about the counterfeiting or non-counterfeiting of an access rule enforcer, secure state information about a system region of the electronic device, or secure state information about an application installed in the electronic device.

3. The electronic device of claim 1, wherein the specified condition is determined on the basis of the kind of the security-related service request command.

4. The electronic device of claim 1, wherein the command of requesting the security related service is received from the processor or an external electronic device.

5. The electronic device of claim 1, wherein the secure element receives secure state information of an application related to the security-related service request command from the processor,
acquires secure state information of the application related to the security-related service request command from the secure state information of the electronic device stored in the repository, and
processes or ignores the obtained security-related service request command, on the basis of whether the received secure state information of the application and the acquired secure state information of the application are consistent with each other.

6. The electronic device of claim 5, wherein the processor determines the secure state information of the application at a time point at which the application is installed in the electronic device, and
controls to transmit the determined secure state information of the application to the secure element wherein it is stored in the repository of the secure element.

7. The electronic device of claim 1, wherein the secure element determines whether the secure state information of the electronic device satisfies a condition related to the counterfeiting of an access rule enforcer,
identifies an interface corresponding to the obtained security-related service request command, when the secure state information of the electronic device does not satisfy the condition related to the counterfeiting of the access rule enforcer, ignores the obtained security-related service request command when the identified interface is an interface corresponding to the counterfeited access rule enforcer, and performs a function corresponding to the obtained security-related service request command when the identified interface is not the interface corresponding to the counterfeited access rule enforcer.

8. The electronic device of claim 7, wherein the secure element offers a response signal to the security-related service request command, to the processor or the external electronic device, and
wherein the response signal comprises at least one of information requested by the security-related service request command, information indicating a result of a function performed by the security-related service request command, or information indicating a grant or non-grant of a security related service.

9. An operating method of an electronic device, the method comprising:
acquiring, by a processor, secure state information of the electronic device;
storing, by a secure element operating under the control of the processor, the secure state information of the electronic device in a repository within the secure element, wherein the secure state information includes at least one of a secure level of the electronic device or a kind of a secure problem of the electronic device;
obtaining, by the secure element, a security-related service request command;
acquiring, by the secure element, the secure state information of the electronic device stored in the internal repository;
executing an applet corresponding to the application based on the security-related service request command; and
processing or ignoring, by the secure element, the obtained security-related service request command using the applet, on the basis of whether the acquired secure state information of the electronic device satisfies a specified condition,
wherein the processing or ignoring, by the secure element, the obtained security-related service request command comprises:
normally processing, by the secure element, the obtained security-related service request command to perform a function corresponding to the command, in response to the acquired secure state information of the electronic device satisfying the specified condition; and
ignoring, by the secure element, the obtained security-related service request command, in response to the acquired secure state information of the electronic device not satisfying the specified condition.

10. The method of claim 9, wherein the secure state information of the electronic device comprises at least one of information about the rooting or non-rooting of the electronic device, information about the obtaining or non-obtaining of malware, information about a change or non-change of a warranty bit, information about the counterfeiting or non-counterfeiting of an access rule enforcer, secure state information about a system region of the electronic device, or secure state information about an application installed in the electronic device,
the specified condition is determined on the basis of the kind of the security-related service request command, and
the command of requesting the security related service is received from the processor or an external electronic device.

11. The method of claim 9, further comprising receiving, by the secure element, secure state information of an application related to the security-related service request command from the processor,
wherein processing or ignoring, by the secure element, the obtained security-related service request command comprises:
identifying, by the secure element, secure state information of the application related to the security-related service request command from acquired secure state information; an
processing or ignoring, by the secure element, the obtained security-related service request command, on the basis of whether the received secure state information of the application and the identified secure state information of the application are consistent with each other.

12. The method of claim 11, further comprising:
determining, by the processor, the secure state information of the application at a time point at which the application is installed in the electronic device; and
controlling, by the processor, to transmit the determined secure state information of the application to the secure element wherein it is stored in the repository of the secure element.

* * * * *